United States Patent
Kim et al.

(10) Patent No.: US 12,087,294 B2
(45) Date of Patent: Sep. 10, 2024

(54) DEVICE AND METHOD FOR PROVIDING RECOMMENDED SENTENCE RELATED TO UTTERANCE INPUT OF USER

(71) Applicant: SAMSUNG ELECTRONICS CO., LTD., Suwon-si (KR)

(72) Inventors: Munjo Kim, Suwon-si (KR); Hojung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 296 days.

(21) Appl. No.: 17/587,823

(22) Filed: Jan. 28, 2022

(65) Prior Publication Data

US 2022/0238107 A1    Jul. 28, 2022

Related U.S. Application Data

(63) Continuation of application No. PCT/KR2022/001371, filed on Jan. 26, 2022.

(30) Foreign Application Priority Data

Jan. 28, 2021    (KR) .................. 10-2021-0012644

(51) Int. Cl.
*G10L 15/22* (2006.01)
*G10L 15/19* (2013.01)

(52) U.S. Cl.
CPC .............. *G10L 15/22* (2013.01); *G10L 15/19* (2013.01); *G10L 2015/228* (2013.01)

(58) Field of Classification Search
USPC ................ 704/246, 247, 251, 252, 257, 275
See application file for complete search history.

(56) References Cited

U.S. PATENT DOCUMENTS

| 10,521,723 B2 | 12/2019 | Hwang et al. |
| 10,565,991 B2 | 2/2020 | Yae |

(Continued)

FOREIGN PATENT DOCUMENTS

| JP | 2010-181651 A | 8/2010 |
| JP | 2013-83796 A | 5/2013 |

(Continued)

OTHER PUBLICATIONS

Communication dated Nov. 18, 2022, issued by the European Patent Office in EP Patent Application No. 22700278.9.

(Continued)

*Primary Examiner* — Leonard Saint-Cyr
(74) *Attorney, Agent, or Firm* — Sughrue Mion, PLLC

(57) ABSTRACT

A device and method for providing a recommended sentence related to an utterance input of a user are provided. The method, performed by the device for providing a voice assistant service, includes determining whether the utterance input is a single utterance input; obtaining application history data related to the utterance input from among application history data representing an execution history of one or more applications executed by the user in the device when the utterance input is the single utterance input; generating the recommended utterance sentence related to the utterance input by using the utterance input and the obtained application history data; and outputting the generated recommended utterance sentence.

15 Claims, 12 Drawing Sheets

(56) References Cited

U.S. PATENT DOCUMENTS

| | | | |
|---|---|---|---|
| 2004/0176958 A1* | 9/2004 | Salmenkaita | H04M 3/4938 704/275 |
| 2014/0038578 A1* | 2/2014 | Bouzid | H04W 4/18 455/418 |
| 2014/0270258 A1 | 9/2014 | Wang | |
| 2018/0261223 A1 | 9/2018 | Jain et al. | |
| 2019/0235888 A1 | 8/2019 | Li et al. | |
| 2020/0027456 A1* | 1/2020 | Kim | G10L 15/22 |
| 2020/0382635 A1 | 12/2020 | Vora et al. | |
| 2021/0035567 A1 | 2/2021 | Newendorp et al. | |
| 2021/0065572 A1 | 3/2021 | Bak | |
| 2021/0280180 A1* | 9/2021 | Skobeltsyn | G06F 16/3322 |

FOREIGN PATENT DOCUMENTS

| | | |
|---|---|---|
| KR | 10-1505127 B1 | 3/2015 |
| KR | 10-2016-0056548 A | 5/2016 |
| KR | 10-1749009 B1 | 6/2017 |
| KR | 10-2018-0068850 A | 6/2018 |
| KR | 10-1914548 B1 | 11/2018 |
| KR | 10-2019-0041111 A | 4/2019 |
| KR | 10-2020-0009332 A | 1/2020 |
| KR | 10-2120605 B1 | 6/2020 |

OTHER PUBLICATIONS

Communication dated Apr. 29, 2022, issued by the International Searching Authority in counterpart International Application No. PCT/KR2022/001371 (PCT/ISA/220, 210, 237).

* cited by examiner

FIG. 4

| App | Action | Parameter | Time (yyyy-mm-ddZ-hh:mm:ss) | Count |
|---|---|---|---|---|
| Message | Send | {what: Text, to: MOM} | 2020-10-20Z07:00:00 (E.G., UTC: 100) | 10 |
| SamsungPay | Send | {what: Money, to: DAD} | 2020-09-20Z08:00:00 (E.G., UTC: 80) | 5 |
| ShareVia | Send | {what: Picture, to: kakaoTalk} | 2020-06-20Z09:00:00 (E.G., UTC: 60) | 20 |
| Internet | Search | {what: TV, at: URL} | 2020-08-10Z10:00:00 | 5 |
| SmartThings | Up | {what: volume, at: TV} | 2020-10-20Z11:00:00 | 10 |
| Settings | Off | {what: power} | 2020-08-15Z12:00:00 | 5 |
| Settings | Off | {what: screen} | 2020-10-20Z13:00:00 | 10 |
| SmartThings | Off | {what: power, at: air-conditioner} | 2020-08-20Z14:00:00 | 15 |

DEVICE AND METHOD FOR PROVIDING RECOMMENDED SENTENCE RELATED TO UTTERANCE INPUT OF USER

CROSS-REFERENCE TO RELATED APPLICATIONS

This application is a bypass continuation of International Application No. PCT/KR2022/001371, filed on Jan. 26, 2022, which claims priority to Korean Patent Application No. 10-2021-0012644, filed on Jan. 28, 2021, in the Korean Intellectual Property Office, the disclosures of which are incorporated herein in their entireties by reference.

TECHNICAL FIELD

The disclosure relates to a device and method for providing a recommended sentence related to an utterance input of a user. More particularly, the disclosure relates to a device and method for generating and providing a recommended utterance sentence related to a single utterance input of a user.

BACKGROUND ART

As multimedia technology and network technology develop, users may receive various services via their devices. In particular, as speech recognition technology develops, a user may input a speech (e.g., utterance) to a device and receive a response according to the speech or utterance input.

However, in the related art, when it is difficult to grasp a user's intention because an utterance input of the user is short, there is a problem in that it is difficult to provide a voice assistant service to the user that is based on or reflects the user's intention. Accordingly, there is a need for a technology capable of accurately predicting the user's intention even for a short utterance input of the user and effectively providing a response to the user according to the user's intention.

DISCLOSURE

Technical Problem

Provided are a device and method for providing a recommended utterance sentence related to a single utterance input of a user considering an execution history of an application executed by the user.

Further provided are a device and method for providing a recommended sentence related to an utterance input of a user, thereby providing a recommended utterance sentence supported by a voice assistant service considering an execution history of an application executed by the user.

Additional aspects will be set forth in part in the description which follows and, in part, will be apparent from the description, or may be learned by practice of the presented embodiments.

Technical Solution

In accordance with an aspect of the disclosure, a method, performed by a device for providing a voice assistant service, of providing a recommended utterance sentence related to an utterance input of a user includes: receiving the utterance input of the user; determining whether the utterance input is a single utterance input; based on the utterance input being determined as the single utterance input, obtaining application history data related to the utterance input from among application history data representing an execution history of one or more applications executed by the user in the device; generating the recommended utterance sentence related to the utterance input by using the utterance input and the obtained application history data; determining whether the recommended utterance sentence is supported by the voice assistant service provided by the device; and based on the recommended utterance sentence being determined to be supported by the voice assistance service, outputting the recommended utterance sentence on a screen of the device.

In accordance with another aspect of the disclosure, a device for providing a voice assistant service includes: a microphone configured to receive an utterance input of a user; a memory storing one or more instructions; and a processor configured to provide a recommended utterance sentence related to an utterance input of a user by executing the one or more instructions to: determine whether the utterance input is a single utterance input; based on the utterance input being determined as the single utterance input, obtain application history data related to the utterance input from among application history data representing an execution history of one or more applications executed by the user in the device; generate the recommended utterance sentence related to the utterance input by using the utterance input and the obtained application history data; determine whether the recommended utterance sentence is supported by the voice assistant service provided by the device; and based on the recommended utterance sentence being determined to be supported by the voice assistance service, control to output the recommended utterance sentence on a screen of the device.

In accordance with another aspect of the disclosure, a non-transitory computer-readable recording medium has recorded thereon a computer program for performing the method.

In accordance with another aspect of the disclosure, a device for providing a voice assistant service includes: a memory storing one or more instructions; and a processor configured to provide a recommended utterance sentence related to an utterance input of a user by executing the one or more instructions to: obtain the utterance input of the user; determine whether the utterance input is a single utterance input; based on the utterance input being determined as the single utterance input, obtain application history data related to the utterance input from among application history data representing an execution history of one or more applications executed by the user in at least one of the device or another device; generate the recommended utterance sentence related to the utterance input by using the utterance input and the obtained application history data; and control to output the recommended utterance sentence.

DESCRIPTION OF DRAWINGS

The above and other aspects, features, and advantages of certain embodiments of the present disclosure will be more apparent from the following description taken in conjunction with the accompanying drawings, in which:

FIG. 4 is a diagram illustrating an example of a table of application history data of a user, according to an embodiment;

MODE FOR INVENTION

Figure 1:
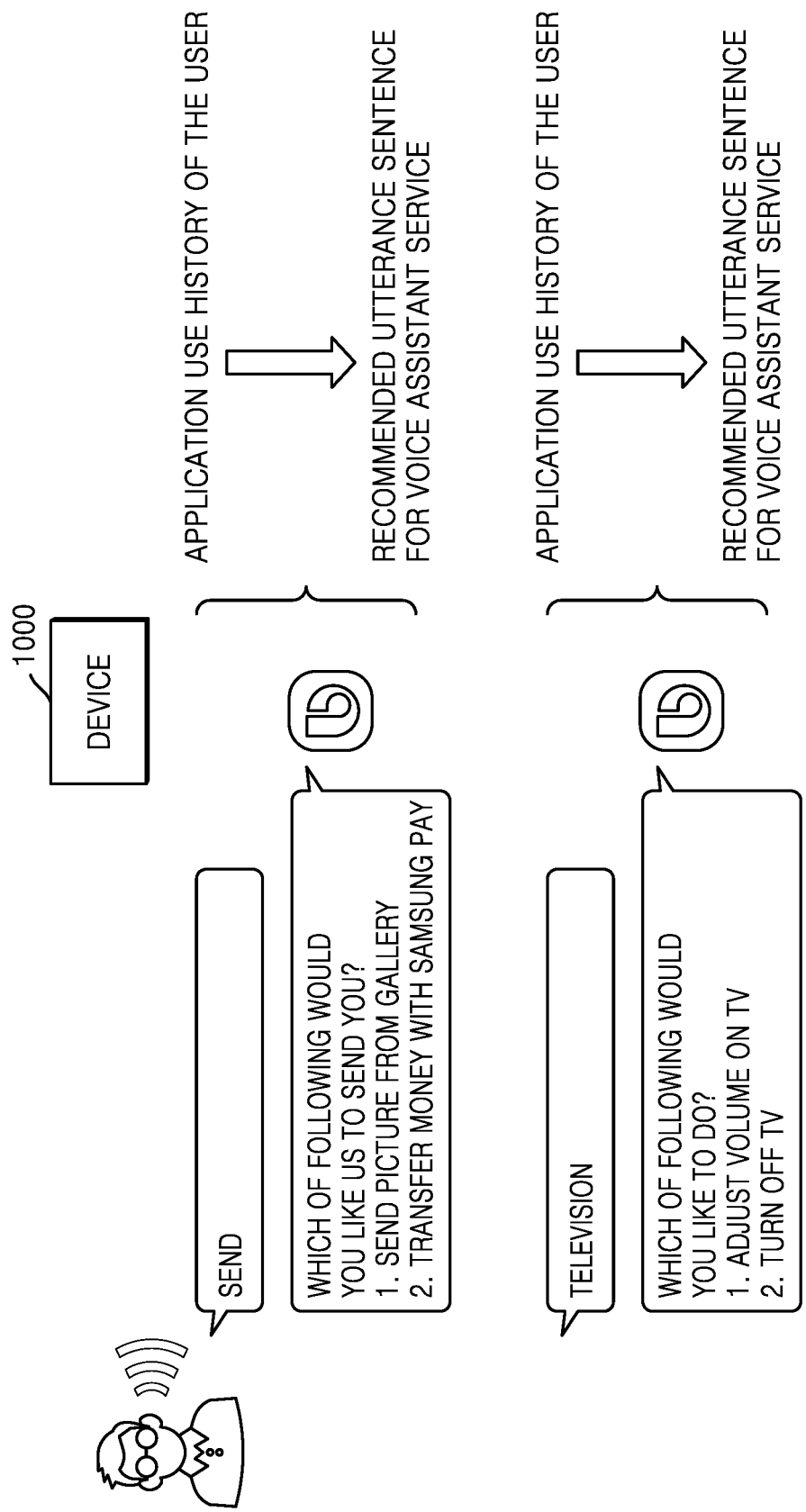
FIG. 1 is a diagram illustrating an example in which a voice assistant service with respect to a single utterance input of a user is provided by a device, according to an embodiment.

Throughout the disclosure, expressions such as "at least one of a, b or c" indicates only a, only b, only c, both a and b, both a and c, both b and c, all of a, b, and c, or variations thereof.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to embodiments described herein. To clearly describe the disclosure, parts that are not associated with the description may be omitted from the drawings, and throughout the specification, identical reference numerals refer to identical parts.

In the description of the embodiments of the disclosure, when a part is "connected" to another part, the part may not only be "directly connected" to another part but may also be "electrically connected" to another part with another device intervening in them. When it is assumed that a certain part includes a certain component, the term "including" means that a corresponding component may further include other components unless a specific meaning opposed to the corresponding component is provided herein.

A single utterance input used herein is an input made by a short utterance indicating one term, and may be an input by an utterance including one word or one phrase. The single utterance input may include, for example, an utterance including a noun, an utterance including a noun phrase, an utterance including a verb, or an utterance including a verb phrase.

Application history data may be data indicating an execution history of an application executed by a device. The application history data may include, for example, an identification value or information of the application, a type of the application, a type of an action executed by the application, a parameter related to the action executed by the application, a time when the action of the application is executed, a cumulative execution count of the action, etc. Also, the application history data indicating the execution history of the application executed by the user may be history data regarding the action executed by the application based on a user input of the user into the device.

A service utterance sentence may be an utterance sentence received from the user and an utterance sentence provided to the user for a voice assistant service, and may be an utterance sentence related to an action supported by functions of a device and another device related to the voice assistant service.

Embodiments will now be described more fully with reference to the accompanying drawings.

In certain examples of the present disclosure, a user may wish to utilize a function, operation, service, or the like, provided by a device of the user (e.g. a mobile telephone or computing device), or a device connected to the user device (e.g. a server). In the following, references to a function may encompass references to one or more of a function(s), an operation(s), a service(s), and the like.

To utilize a function, the user may provide a user input to the user device. The user input may be an audible input, for example a sound input (e.g. comprising one or more sounds) or a vocal input (e.g. comprising one or more words and/or one or more phrases). A vocal may include an "utterance". However, the present disclosure is not limited to an audible input. For example, the user input may be a text input or any other suitable type of input.

In certain examples, a specific function may be defined by one or more items of "function information". For example, function information may define one or more of (i) the function to be performed, (ii) an application or service that can or should perform the function, (iii) a device to perform the function, and (iv) one or more parameters of the function. For example, if the function relates to a financial transaction then a parameter may define a monetary amount of the transaction. If the function relates to transmitting data then a parameter may define a destination of the data. If the function relates to an action to be carried out by a device then a parameter may specify the device to carry out the action. The present disclosure is not limited to these examples, and the skilled person will readily contemplate many other examples of function information defining a function.

The user input may be analyzed (for example by parsing the user input and analyzing the parsed components) to determine certain elements of the user input, referred to as "input elements" (e.g. certain sounds, words and/or phrases), that correspond to items of function information defining a function. For example, if the user input contains one or more of the words or phrases (input elements) "send", "$100", "to Mom" and "using Samsung Pay" then it may be determined that each of these words or phrases (input elements) corresponds to an item of function information defining a function.

The type of function information item corresponding to each input element may be determined as part of the analysis. For example, an input element in the form of a verb (e.g. "send") may be determined to correspond to an item of function information defining the function to be performed. An input element containing a monetary symbol (e.g. "$") may be determined to correspond to an item of function information defining a monetary amount. An input element in the form of "to [noun]" (e.g. "to Mom") may be determined to correspond to an item of function information item defining a destination. An input element containing a recognized service (e.g. "Samsung Pay") may be determined to correspond to an item of function information specifying a service that can or should perform the function.

When analyzing the user input, variations and/or synonyms may be considered. For example, the words "send", "transmit" and "transfer" may each be determined to correspond to the same "send" function.

As described above, a user input contains one or more "input elements", while a function is defined by one or more items of "function information". The input elements may be mapped to items of function information, based on analysis of the user input, to determine the specific function corresponding to the user input.

In some cases, a user input may contain sufficient information to fully define a function to be performed. For example, when input elements derived from the user input are mapped to items of function information, the items of function information together may define a specific function sufficiently that the function can be performed. In this case, the user input may be regarded as unambiguously defining the function. One example may be a user input "send $100 to Mom using Samsung Pay".

On the other hand, in other cases, a user input may contain insufficient information to fully define a function to be performed. For example, when input elements derived from the user input are mapped to items of function information, one or more items of function information necessary to perform the function may be missing (e.g. unknown or undefined), and therefore it may not be possible to perform the function. In this case, there may be some ambiguity in what function is intended to correspond to the user input. For example, the user input may correspond to two or more possible alternative functions. Various examples may be "send $100 to Mom", "send to Mom using Samsung Pay", "send $100 using Samsung Pay", "send $100" or "send".

Certain examples of the present disclose may determine possible candidates for the missing items of function information. For example, given the user input "send $100 using Samsung Pay", possible candidates for the missing items of function information may be "to Mom", "to Dad", "to Avi", etc. For example, given the user input "send to Mom using Samsung Pay", possible candidates for the missing items of function information may be "$50", "$100", "$200", etc. In the case that two or more items of function information are missing, possible candidates for each missing item may be determined. In certain examples, candidates for possible combinations of missing items of function information may be determined, for example "$100 to Mom", "$50 to Dad", "$200 to Avi", etc.

In certain examples, candidates for one or more "enhanced" or "augmented" inputs may be determined by supplementing the original user input with one or more candidate items, or combinations of items, of function information as the missing items. For example, given the user input "send using Samsung Pay", an example of a candidate augmented input may be "send $100 to Mom using Samsung Pay".

Certain examples of the present disclosure may output (e.g. visually via a display, or audibly via a speaker) two or more of the candidate items of function information. For example, a list of candidate items may be displayed for each missing item of function information. The user may then select one or more of the candidate items, and the selected items may be used to supplement the original user input to generate an augmented input. Alternatively, certain examples of the present disclosure may output (for example in the form of a list) two or more candidate augmented inputs determined according to the preceding paragraph. The user may then select a candidate augmented input. In either case, the resulting augmented input may be used to perform the function.

As described above, when a user input is ambiguous, certain examples of the present disclosure allow one or more missing items of function information to be completed by determining one or more candidates for the missing items (or combinations of items). If more than one candidate is determined then the user may select a candidate. The resulting unambiguous input may then be used for performing the function.

The candidates for the missing items, or combinations of items, of function information may be determined using any suitable technique.

In certain examples of the present disclosure, the candidates may be determined based on a history of functions previously performed. For example, when functions are performed, the items of function information corresponding to each performed function are recorded. When an ambiguous user input is provided, the items of function information that are mapped to input elements generated based on the user input (referred to below as "present items" of function information, in contrast to "missing item" of function information) are compared to the stored information and candidates for the missing items of function information are determined based on the comparison.

For example, candidates for missing items of function information may be determined as those items that occur relatively frequently in combination with the present items of function information within in the recorded history. For example, in the recorded history, if "to Mom" and "$100" occur relatively frequently in combination with "send . . . using Samsung Pay", then "to Mom" and "$100" may be determined as candidates. Accordingly, a candidate augmented input "send $100 to Mom using Samsung Pay" may be determined based on the user input "send using Samsung Pay".

As noted above, items of function information corresponding to each previously performed function may be stored. For example, a set of items of function information corresponding to a particular previously performed function may be stored as a corresponding particular entry or record in a table. When a user input is provided, one or more table entries may be selected based on the items of function information obtained from the user input, and one or more corresponding candidates for enhanced inputs may be determined based on the selected table entries.

For convenience, in the following, items of function information corresponding to a current user input may be referred to as "current items", and items of function information corresponding to a previously performed function, for example recorded in a corresponding entry in the table, may be referred to as "previous items". Accordingly, one or more table entries comprising previous items may be selected based on one or more current items. For example, those table entries comprising one or more previous items matching one or more current items may be selected. In some cases, only those table entries comprising previous items matching all current items may be selected. If no such table entries exist, then those table entries comprising the highest number of previous items matching one or more current items may be selected.

In certain examples, the table entries may be ranked based on one or more factors.

One factor may be based on how many previous items match current items. For example, table entries including a larger number of previous items matching current items may be ranked relatively higher.

Another factor may be based on how recently a function has been performed. For example, table entries corresponding to functions performed more recently may be ranked relatively higher.

Another factor may be based on how frequently a function has been performed. For example, table entries corresponding to functions performed more frequently may be ranked relatively higher.

Another factor may be based on a correspondence between ambiguous user inputs provided and functions eventually performed following the ambiguous user inputs. For example, if a certain ambiguous user input is provided and as a result of the techniques described herein a certain fully defined function is selected to be performed, then the table entry corresponding to the function performed may include information specifying the ambiguous user input (e.g. the (incomplete) items function information corresponding to the user input). Subsequently, if the same ambiguous user input is provided again, then table entries including information specifying the ambiguous user input may be ranked relatively higher.

The skilled person will appreciate that the present disclosure is not limited to these factors, and various other factors will readily occur to the skilled person.

The various factors may be weighted such that some factors influence the ranking more than other factors.

Following the ranking, one or more of the highest ranked table entries may be selected as one or more corresponding candidates for enhanced inputs.

Certain examples of the present disclosure provide a method for determining a modified user input for performing a function, the method comprising: receiving a user input; analyzing the user input to determine one or more input elements from the user input; determining one or more first items of function information corresponding to the one or more input elements; determining one or more second items of function information; and determining one or more modified user inputs based on the first and second items of function information, wherein the one or more second items of function information are determined based on the one or more first items of function information and pre-stored information including items of function information corresponding to previously performed functions.

In certain examples, the user input comprises a voice input.

In certain examples, the input elements comprise one or more words and/or one or more phrases.

In certain examples, analyzing the user input comprises parsing the user input.

In certain examples, the function information comprises information at least partly defining a function (e.g. information defining one or more of (i) the function to be performed, (ii) an application or service that can or should perform the function, (iii) a device to perform the function, and (iv) one or more parameters of the function).

In certain examples, the method further comprises: outputting (e.g. displaying) the one or more modified user inputs; and receiving a user input selecting one of the output modified user inputs.

In certain examples, the method further comprises determining one or more functions corresponding to the one or more modified user inputs.

In certain examples, the method may comprise determining whether a function corresponding to a modified user input is supported.

Certain examples of the present disclosure provide a method, performed by a device for providing a voice assistant service, of providing a recommended utterance sentence related to an utterance input of a user, the method comprising: receiving the utterance input of the user; obtaining application history data related to the utterance input from among application history data representing an execution history of an application executed by the user in the device; and generating the recommended utterance sentence related to the utterance input by using the utterance input and the obtained application history data.

In certain examples, the method may further comprise determining whether the utterance input is a single utterance input.

In certain examples, obtaining the application history data may comprise obtaining the application history data when the utterance input is the single utterance input.

In certain examples, the method may further comprise determining whether the recommended utterance sentence is supported by the voice assistant service provided by the device.

In certain examples, the method may further comprise displaying the recommended utterance sentence on a screen of the device.

In certain examples, displaying the recommended utterance sentence may comprise displaying the recommended utterance sentence when the recommended utterance sentence is supported by the voice assistant service.

In certain examples, the utterance input and recommended utterance sentence may alternatively comprise an equivalent text input and recommended text sentence.

FIG. 1 is a diagram illustrating an example in which a voice assistant service with respect to a single utterance input of a user is provided by a device 1000 according to an embodiment.

Referring to FIG. 1, the device 1000 may provide a voice assistant service to the user by generating and providing a recommended utterance sentence related to the single utterance input of the user.

The device 1000 may receive an utterance input of the user, and determine whether the received utterance input is the single utterance input. When the utterance input of the user is the single utterance input, the device 1000 may generate the recommended utterance sentence related to the single utterance input of the user by using an application use history of the user. The device 1000 may retrieve application history data related to the single utterance input from among the application history data of the user by using a word included in the single utterance input, and provide the recommended utterance sentence support by the voice assistant service to the user by using the retrieved application history data.

Figure 2:
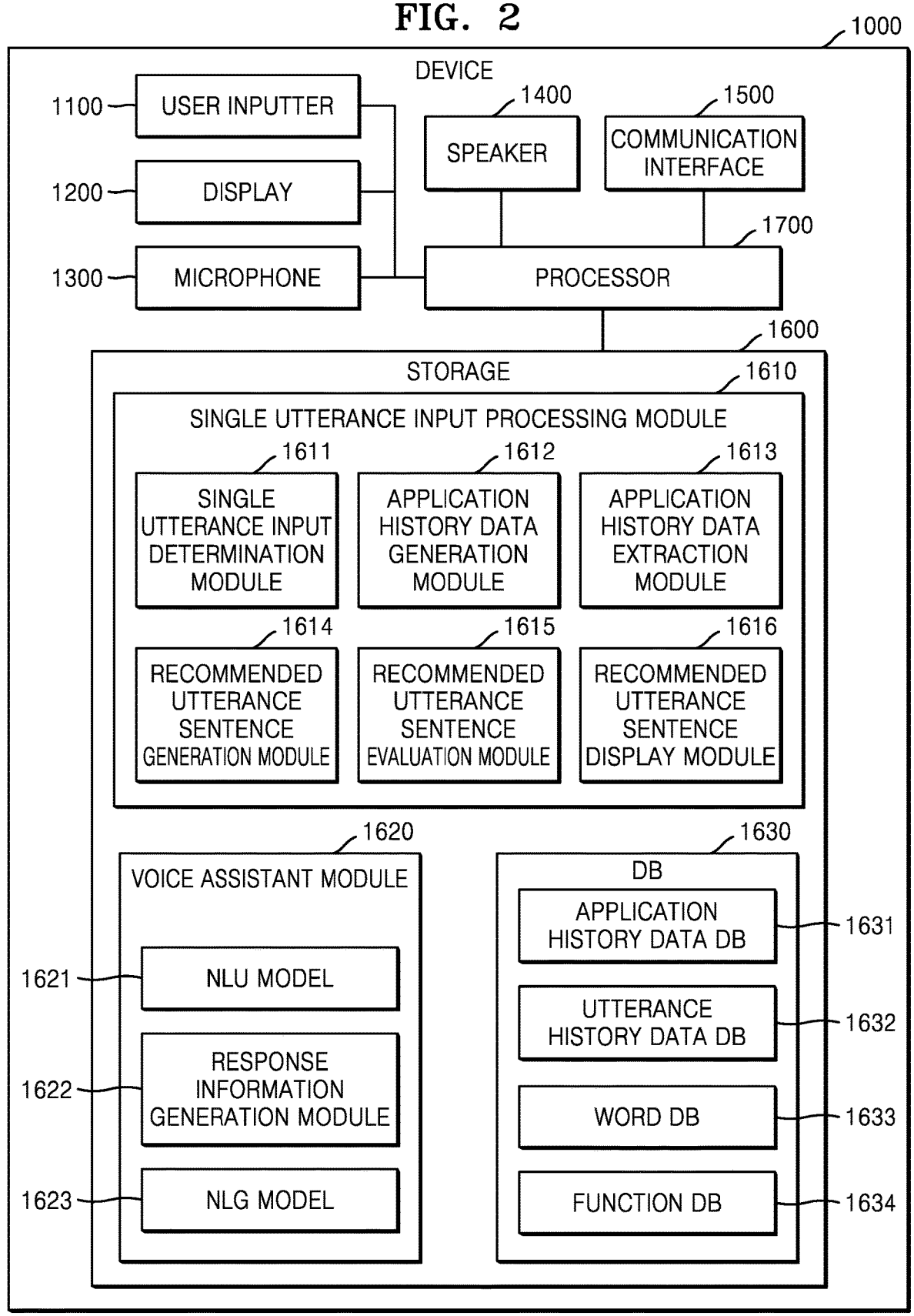
FIG. 2 is a block diagram of a device according to an embodiment.

FIG. 2 is a block diagram of the device 1000 according to an embodiment.

Referring to FIG. 2, the device 1000 according to an embodiment may include a user inputter 1100 (e.g., user input device or interface), a display 1200, a microphone 1300, a speaker 1400, a communication interface 1500, and a storage 1600 and a processor 1700.

The user inputter 1100 refers to a device used by a user to input data for controlling the device 1000. For example, the user inputter 1100 may include a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, etc., but is not limited thereto. The user inputter 1100 may receive a user input for determining an utterance sentence corresponding to an utterance input of a user.

The display 1200 displays and outputs information processed by the device 1000. For example, the display 1200 may display a graphical user interface (GUI) for providing information for providing a voice assistant service to the user.

Meanwhile, when the display 1200 and a touch pad are constructed as a touch screen in a layer structure, the display 1200 may be used as an input device as well as an output device. The display 1200 may include at least one of a liquid crystal display, a thin film transistor-liquid crystal display, an organic light-emitting diode, a flexible display, a three-dimensional (3D) display, or an electrophoretic display. According to implementation types of the device 1000, the device 1000 may include two or more displays 1200.

The microphone 1300 receives and processes an external sound signal as electrical speech data. The microphone 1300 may receive an utterance input of the user for the voice assistant service.

The speaker 1400 outputs audio data received from the communication interface 1500 or stored in the storage 1600. The speaker 1400 may output sound of a response message of the voice assistant service.

The communication interface 1500 may include one or more components that allow communication with another device and/or a server. For example, the communication interface 1500 may include a short-range wireless communicator, a mobile communicator, and a broadcast receiver. The short-range wireless communicator may include, but is not limited to, a Bluetooth Low Energy (BLE) communicator, a near field communication (NFC) unit, a wireless local area network (WLAN) (WIFI) communicator, a ZigBee communicator, an infrared Data Association (IrDA) communicator, a WIFI Direct (WFD) communicator, an ultra-wideband (UWB) communicator, and an Ant+ communicator. The mobile communicator transmits and receives a radio signal to and from at least one of a base station, an external terminal, and a server over a mobile communication network. Herein, the radio signal may include various forms of data corresponding to transmission/reception of a voice call signal, a video communication call signal, or a text/multimedia message. The broadcast receiver receives a broadcast signal and/or broadcast-related information from the outside through a broadcast channel. The broadcast channel may include a satellite channel and a terrestrial channel. In addition, the communication interface 1500 may transmit/receive the information for providing the voice assistant service to/from an external device and/or a server.

The storage 1600 may store a program to be executed by the processor 1700 (described below) and store data input to or output from the device 1000.

The storage 1600 may include a storage medium of at least one type from among a flash memory type, a hard disk type, a multimedia card micro type, a card type memory (e.g., a secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, or an optical disk.

Programs stored in the storage 1600 may be classified into a plurality of modules according to their functions, and may include, for example, a single utterance input processing module 1610, a voice assistant module 1620, and a database (DB) 1630. The single utterance input processing module 1610 may include a single utterance input determination module 1611, an application history data generation module 1612, an application history data extraction module 1613, a recommended utterance sentence generation module 1614, a recommended utterance sentence evaluation module 1615 and a recommended utterance sentence display module 1616. The voice assistant module 1620 may include a natural language understanding (NLU) model 1621, a response information generation module 1622, and a natural language generation (NLG) model 1623. The DB 1630 may include an application history data DB 1631, an utterance history data DB 1632, a word DB 1633, and a function DB 1634.

The processor 1700 may control an overall operation of the device 1000. For example, the processor 1700 may generally control the user inputter 1100, the display 1200, the microphone 1300, the speaker 1400, the communication interface 1500, and the storage 1600 by executing the programs (e.g., modules) stored in the storage 1600.

According to some embodiments, the processor 1700 may execute the single utterance input processing module 1610 stored in the storage 1600 to determine that an utterance input of the user is a single utterance input, and generate and provide a recommended utterance sentence related to the single utterance input. The single utterance input processing module 1610 may include the single utterance input determination module 1611, the application history data generation module 1612, the application history data extraction module 1613, the recommended utterance sentence generation module 1614, the recommended utterance sentence evaluation module 1615 and the recommended utterance sentence display module 1616.

According to some embodiments, the processor 1700 may determine whether the utterance input of the user is the single utterance input by executing the single utterance input determination module 1611. The single utterance input is an input made by a short utterance indicating one term, may be an input by an utterance including one word or one phrase and may include, for example, an utterance including a noun, an utterance including a noun phrase, an utterance including a verb, or an utterance including a verb phrase. The single utterance input determination module 1611 may determine that the utterance input of the user is the single utterance input when a preset part of speech (POS) is a POS corresponding to the term indicated by the utterance input of the user, and/or when a length of the term indicated by the utterance input of the user is less than or equal to a preset threshold. For example, the single utterance input determination module 1611 may determine whether the POS corresponding to the term indicated by the utterance input of the user is a noun, a verb, a noun phrase, or a verb phrase by using a POS tagger. Also, for example, a length of the term corresponding to the single utterance input may be preset, and the single utterance input determination module 1611 may determine whether the length of the term corresponding to the utterance input of the user is less than a preset length (e.g., a preset number of words and/or a preset number of syllables).

According to some embodiments, the processor 1700 may generate or obtain application history data indicating an execution history of an application executed by the user by executing the application history data generation module 1612. The application history data may be data indicating an execution history of an application executed by the device 1000. The application history data may include, for example, an identification value of the application, a type of the application, a type of an action executed by the application, a parameter related to the action executed by the application, a time when the action of the application is executed, a cumulative execution count of the action, etc. The application history data may include information about the execution history of the application executed by the device 1000 according to a user input irrespective or independent of (or not just via) the voice assistant service. In addition, the application history data may be generated and stored in the storage 1600 before the device 1000 receives the single utterance input.

The processor 1700 may generate the application history data of the user by collecting application history data related to terms having a specific POS. The processor 1700 may generate the application history data of the user, for example, as application history data related to a verb or verb phrase, based on an intent of the application, a use history of a specific function of the application, a selection history of a specific button of a GUI of the application, etc. The processor 1700 may generate the application history data of the user, for example, as application history data related to a noun or a noun phrase, based on a use history of the application having a name of the noun or noun phrase, a history of a user's action that uses the noun or noun phrase as a keyword, etc.

Meanwhile, it has been described above that the processor 1700 generates and stores the application history data in the storage 1600 irrespective of the voice assistant service, but the disclosure is not limited thereto. The processor 1700 may store application history data supported by the voice assistant service in the storage 1600.

In this case, the processor 1700 may generate query sentences in advance from service utterance sentences used by the voice assistant service, and may match and store the query sentences and the service utterance sentences. The service utterance sentence may be an utterance sentence received from the user and an utterance sentence provided to the user for the voice assistant service, and may be an utterance sentence related to an action supported by functions of the device 1000 and/or another device related to the voice assistant service. Also, the processor 1700 may compare the generated application history data with a query sentence generated from the service utterance sentence, select the application history data determined to be supported by the voice assistant service, and store the application history data in the storage 1600. Also, when storing the application history data supported by the voice assistant service, the processor 1700 may convert and store a query sentence corresponding to the application history data into the query sentence generated from the service utterance sentence.

According to some embodiments, the processor 1700 may extract application history data related to the utterance input of the user from among the application history data stored in the storage 1600 by executing the application history data extraction module 1613. The application history data stored in the storage 1600 may include, for example, application history data generated by the device 1000 or another device and application history data generated by a server. When it is determined that the utterance input of the user is the single utterance input, the processor 1700 may retrieve and extract the application history data related to the utterance input of the user from among the application history data stored in the storage 1600, so as to generate a recommended utterance sentence with respect to the utterance input of the user.

Also, the processor 1700 may generate a search query for retrieving the application history data related to the utterance input of the user. For example, when the utterance input of the user is a single utterance input of a verb or a verb phrase, the processor 1700 may generate the search query for retrieving an action executed by an application in the device 1000. In this case, when a word corresponding to the utterance input of the user is "send", by way of example, the processor 1700 may generate "Action/send" for retrieving an action in the application history data as the search query. Also, for example, when the utterance input of the user is a single utterance input of a noun or a noun phrase, the processor 1700 may generate the search query for retrieving a name of the application and a parameter related to the action executed by the application. In this case, when the word corresponding to the utterance input of the user is "TV", by way of example, the processor 1700 may generate "App/TV" for retrieving the name of the application in the application history data, and "Para/TV" for retrieving the parameter related to the action of the application in the application history data as the search query.

While it has been described above that application history data related to the utterance input is retrieved by using an utterance input word as the search query, it is understood that one or more other embodiments not limited thereto. For example, the processor 1700 may extract words similar to the utterance input word from the similar word DB 1633, and generate the search query using the utterance input word and the extracted similar words.

Furthermore, the search query may be generated using the service utterance sentence provided by the voice assistant service. In this case, the processor 1700 may obtain a service utterance sentence related to the utterance input word. The processor 1700 may obtain, for example, a service utterance sentence related to the utterance input by using a machine learning-based classification algorithm, or may obtain a service utterance sentence including a word which is similar to the utterance input word in a term frequency-inverse document frequency (TF-IDF). Also, the processor 1700 may generate the query sentence for retrieving the application history data from the service utterance sentence related to the utterance input. In this case, the generated query statement may be generated to have a format of the application history data.

The processor 1700 may retrieve the application history data related to the utterance input of the user using the generated search query. For example, when the search query is "Action/send", the processor 1700 may retrieve history data in which a value corresponding to "Action" is "send" from among the application history data. When the search query is "App/TV" and "Para/TV", the processor 1700 may retrieve history data in which a value corresponding to "App" is "TV" from among the application history data and history data including "TV" from among "Para" values. Also, the processor 1700 may filter and select history data that has been executed greater than or equal to a certain or predetermined threshold from among the retrieved history data.

According to some embodiments, the processor 1700 may generate the recommended utterance sentence related to the utterance input of the user by executing the recommended utterance sentence generation module 1614. The processor 1700 may determine a word for generating (e.g., necessary for generating) the recommended utterance sentence in addition to the utterance input word. The word for generating the recommended utterance sentence in addition to the utterance input word may be, for example, a word of a POS different from that of the utterance input word. The processor 1700 may analyze the application history data related to the utterance input word and select the word for generating the recommended utterance sentence. For example, when the utterance input word is "send", the processor 1700 may select "gallery application" and "picture" which are words of a POS different from that of "send" from application history data related to "send" as words for generating the recommended utterance sentence. Also, for example, when the utterance input word is "send", the processor 1700 may select "Samsung Pay" and "money" which are words of the POS different from that of "send" from the application history data related to "send" as the words for generating the recommended utterance sentence.

Also, the processor 1700 may generate the recommended utterance sentence by combining the utterance input word and the one or more words determined from the application history data. For example, the processor 1700 may combine the utterance input word "send" with the words "gallery application" and "picture" determined from the application history data to generate a recommended utterance sentence "Send a picture from the gallery application". By way of another example, the processor 1700 may combine the utterance input word "send" with the words "Samsung Pay" and "money" determined from the application history data to generate a recommended utterance sentence "Send money with Samsung Pay".

In this case, some words of the recommended utterance sentence may be modified to similar words. For example, "Send a picture from the gallery application." may be modified to "Send a picture through the gallery application.", and "Send money with Samsung Pay." may be modified to "Transfer money with Samsung Pay."

Meanwhile, when the application history data is retrieved using the service utterance sentence of the voice assistant service, the processor 1700 may generate the recommended utterance sentence by using the service utterance sentence and the application history data. The processor 1700 may generate the recommended utterance sentence by changing a value of an entity included in the query sentence generated from the service utterance sentence to a value of an entity in the application history data. For example, when the query sentence generated from the service utterance sentence is "{App: Message} & {what: Text} & {Action: Send} & {to: Person}", and the query sentence generated from the history data retrieved from the application history data is "{App: Message} & {what: Text} & {Action: Send} & {to: Person}-{value: Mom}", the processor 1700 may determine a value corresponding to the entity "{to: Person}" in the service utterance sentence as "{value:Mom}". In addition, the processor 1700 may generate a recommended utterance sentence "Send a text to Mom" by using "{App:Message} & {what: Text} & {Action: Send} & {to: Person}-{value: Mom}" generated by modifying the query sentence in the service utterance sentence.

Meanwhile, the processor 1700 may modify the recommended utterance sentence by using a new function supported by the voice assistant service. The processor 1700 may modify the generated recommended utterance sentence in consideration of at least one of a function of an application that is not frequently used by the user or a new function of the application. In this case, the processor 1700 may identify a function related to the utterance input of the user from the application history data related to the utterance input of the user, and when there is a new function of the application related to the identified function, may generate the recommended utterance based on the new function. For example, when the generated recommended utterance sentence is "Send a text with the messenger application", the processor 1700 may modify the recommended utterance sentence to generate "Send a text with the KakaoTalk application." Also, the processor 1700 may, for example, modify the recommended utterance sentence "transfer money with Samsung Pay" to "transfer money with Kakao Pay".

According to some embodiments, the processor 1700 may determine whether the recommended utterance sentence is supported by the voice assistant service by executing the recommended utterance sentence evaluation module 1615. The processor 1700 may identify whether the function corresponding to the recommended utterance sentence is executed by the device 1000 related to the voice assistant service or another device. To this end, the processor 1700 may determine whether the recommended utterance sentence is supported by the voice assistant service by comparing service utterance sentences provided by the voice assistant service with the recommended utterance sentence. The processor 1700 may select a service utterance sentence related to the recommended utterance sentence from among the service utterance sentences provided by the voice assistant service. In addition, the processor 1700 may calculate similarity between the selected service utterance sentence and the recommended utterance sentence, and when the calculated similarity is greater than a preset threshold value, may determine that the recommended utterance sentence is supported by the voice assistant service. For example, the processor 1700 may calculate the similarity between the recommended utterance sentence and the service utterance sentence by using a TF-IDF based cosine similarity technique.

When a plurality of recommended utterance sentences are generated, the processor 1700 may select a recommended utterance sentence to be provided to the user from among the plurality of recommended utterance sentences based on the similarity. For example, the processor may select the recommended utterance sentence (or a predetermined number of recommended utterance sentences) with the highest degree(s) of similarity from among the plurality of recommended utterance sentences.

According to some embodiments, the processor 1700 may display the recommended utterance sentence on the display 1200 of the device 1000 by executing the recommended utterance sentence display module 1616. The processor 1700 may display a certain graphical user interface (GUI) including the recommended utterance sentence supported by the voice assistant service on the display 1200 and receive a feedback input of the user.

The processor 1700 may modify the recommended utterance sentence according to the feedback input of the user. In this case, the processor 1700 may display a GUI for modifying the recommended utterance sentence on the display 1200 and modify the recommended utterance sentence according to a user input through the displayed GUI. Alternatively, the processor 1700 may receive an utterance of the user for modifying the recommended utterance sentence, and modify the recommended utterance sentence based on the utterance of the user.

Also, the processor 1700 may execute a function of the voice assistant service corresponding to the recommended utterance sentence. When the recommended utterance sentence is modified by the user, the processor 1700 may perform a function of the voice assistant service corresponding to the modified recommended utterance sentence.

According to some embodiments, the processor 1700 may provide the voice assistant service to the user by executing the voice assistant module 1620. The voice assistant module 1620 may interpret a user input for the voice assistant service and generate response information to the user input. The voice assistant module 1620 may include the NLU model 1621, the response information generation module 1622, and the NLG model 1623.

The processor 1700 may interpret a sentence generated from the utterance input of the user or the recommended utterance sentence related to the single utterance input of the user by executing the NLU model 1621. The NLU model 1621 may interpret a text corresponding to the user input and output intent and parameter related to a user's intention. The intent is information determined by interpreting the text using the NLU model 1621, and may represent, for example, the user's intention. The intent may include not only intention information indicating the user's intention, but also a numerical value corresponding to the information indicating the user's intention. The numerical value may represent a probability that the text is related to information indicating a particular intent. For example, when a plurality of pieces of information indicating the user's intention are obtained as a result of analyzing the text using the NLU model 1621, intention information in which the numerical value corresponding to each intention information is the maximum may be determined as the intent. Also, the parameter may indicate detailed information related to the intent. The parameter is information related to the intent, and a plurality of types of parameters may correspond to one intent.

The processor 1700 may generate response information of the text based on analysis results of the text by executing the response information generation module 1622. The response information is data related to a response to the text, and may include, for example, data for a response operation of the device 1000 and data provided to another device and/or a server. The response information generating module 1622 may plan actions of the device 1000 and/or another device according to the user's intention based on an output value of the NLU model 1621. For example, the response information generating module 1622 may plan the actions of the device 1000 and/or another device according to the user's intention by using utterance data and action data stored in the DB 1630 based on analysis results of the text. Also, the response information generating module 1622 may generate the response information of the text corresponding to the user input by planning the actions of the device 1000 and/or another device according to the user's intention. For example, the response information generation module 1622 may generate a response message according to the user's intention by using the NLG model 1623. Also, for example, the response information generating module 1622 may obtain response content to be provided to the user, such as text, image, and video. Also, for example, the response information generating module 1622 may determine operations of the device 1000 and/or another device of the user, and also generate a control command for controlling the device 1000 and/or another device.

The DB 1630 may include an application history data DB 1631, an utterance history data DB 1632, a word DB 1633, and a function DB 1634. The application history data 1631 may store application history data related to an execution history of an application executed by the device 1000. The utterance history data DB 1632 may store an utterance sentence received from the user and an utterance sentence provided to the user for the voice assistant service. The word DB 1633 may store information about words and similar words. The function DB 1634 may store information about a function of the device 1000 and/or a function of another device. The function DB 1634 may be updated by adding information about a new function of the device 1000 and/or a new function of another device.

Meanwhile, the device 1000 may provide the recommended utterance sentence to the user by interworking or communicating with a server. In this case, the device 1000 may request a recommended utterance sentence related to a single utterance input of the user from a server, and the server may perform at least some of operations of generating the recommended utterance sentence performed by the device 1000 described herein. Also, the server may perform at least some of operations of generating and managing the application history data performed by the device 1000 described herein. To this end, a storage of the server may store at least some of instructions stored in the storage 1610 of the device 1000 shown in FIG. 2, and a processor of the server may execute the instructions stored in the storage of the server to perform an operation of generating the recommended utterance sentence and an operation of generating and managing the application history data.

For example, the device 1000 may provide a text of the single utterance input to the server, and the server may obtain the application history data related to the single utterance input of the user based on the text of the single utterance input received from the device 1000. In this case, the server may retrieve the application history data related to the single utterance input of the user from among application history data of the user previously stored in the storage of the server. The application history data stored in the storage of the server may include, for example, data representing an execution history of the application executed by the device 1000 of the user and data representing an execution history of the application executed by another device of the user. The application history data stored in the server may include, for example, at least one of history data generated by the device 1000, history data generated by another device, or history data generated by the server. In addition, the server may generate the recommended utterance sentence related to the single utterance input of the user by using the application history data related to the single utterance input, and determine whether the generated recommended utterance sentence is supported by the voice assistant service. The server may determine whether an operation related to the recommended utterance sentence is supported by the device 1000 and/or another device of the user registered in the voice assistant service. Also, the server may provide the recommended utterance sentence supported by the voice assistant service to the device 1000 through a communication interface of the server.

Figure 3:
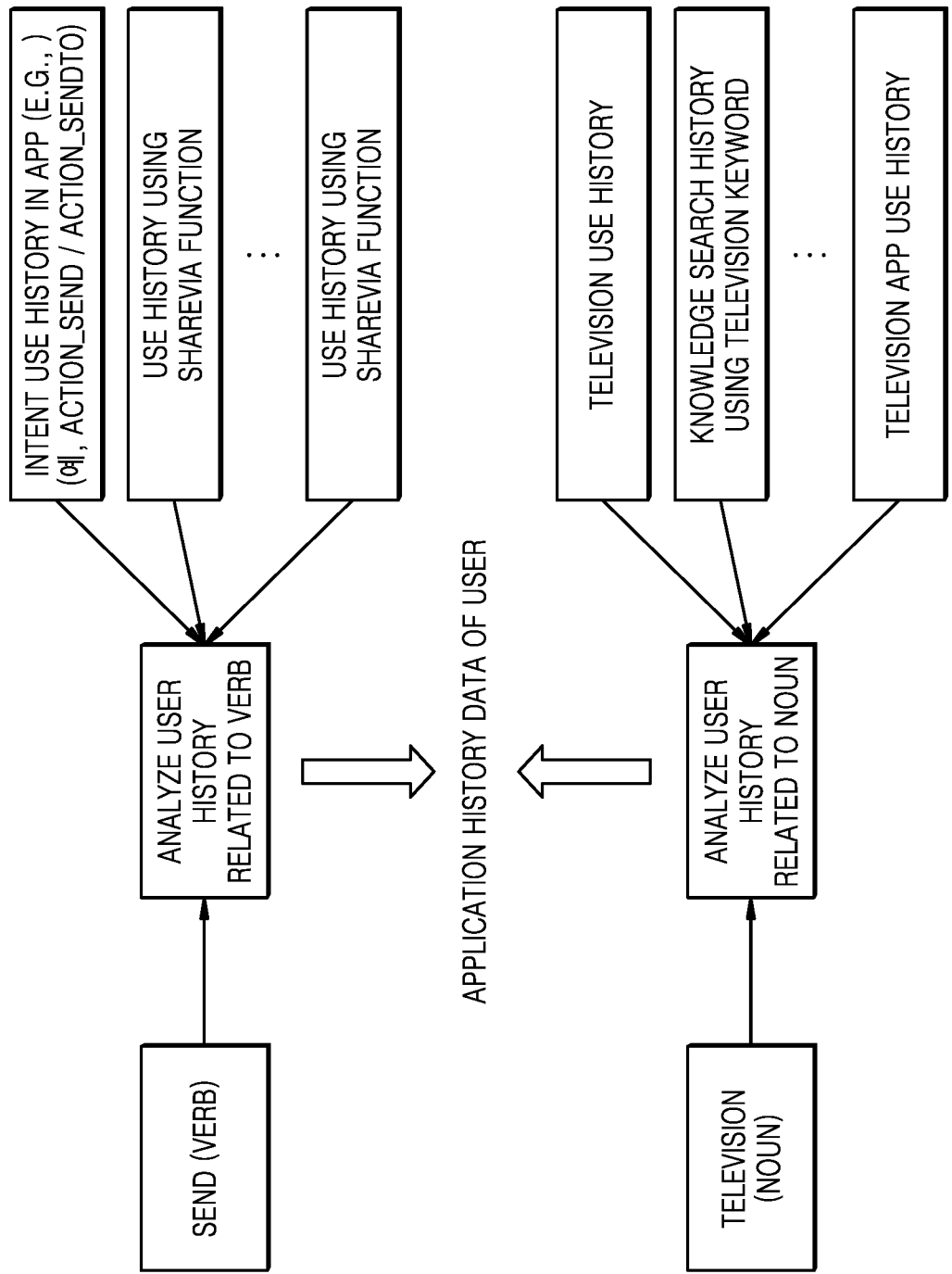
FIG. 3 is a diagram illustrating an example of generating application history data related to a single utterance input according to an embodiment.

FIG. 3 is a diagram illustrating an example of generating application history data related to a single utterance input according to an embodiment.

Referring to FIG. 3, the application history data of a user related to the single utterance input may be generated by analyzing an application history related to a term having a specific POS.

The device 1000 may generate the application history data of the user by collecting a preset type of user history according to a type of the single utterance input. For example, when the type of the single utterance input is a verb, the device 1000 may collect and analyze at least one of a user's activity of an application, a specific function of the application, intent within the application, etc. For example, in order to generate the application history data of the user related to a verb "send", the device 1000 may collect and analyze user history related to the verb by executing the application history data generation module 1612. The device 1000 may collect an intent use history (e.g., ACTION_SEND/ACTION_SENDTO) in an application executed by the user, collect a use history of a share function (e.g., a use history of a ShareVia function) executed by the device 1000, and collect a use history of a GUI related to data transmission of the device 1000. Also, the device 1000 may generate the application history data of the user related to the verb "send" by analyzing the collected data.

When the type of the single utterance input is a noun, for example, the device 1000 may collect and analyze a history in which a noun keyword is used in an application, a name of a device, a name of the application, a name of content, etc. For example, in order to generate application history data of the user related to a noun "television", the device 1000 may collect and analyze the user history related to the noun by executing the application history data generation module 1612. In this case, the device 1000 may collect a history in which the user uses a television, a history in which the user performs a knowledge search using a keyword TV, and a history in which the user uses a television application. The device 1000 may generate the application history data of the user related to the noun "television" by analyzing the collected data.

The application history data collected by the device 1000 may be history data related to an application executed by the device 1000 and/or one or more other devices, and types of user histories collected according to the type of the single utterance input may be set in various ways. In addition, in order to efficiently provide responses to a variety of single utterance inputs, the device 1000 may generate application history data of the user related to various terms in advance and store the application history data in the DB 1630.

FIG. 4 is a diagram illustrating an example of a table of application history data of a user according to an embodiment.

Referring to FIG. 4, the table of the application history data of the user according to an embodiment may include an App field 40, an Action field 41, a Parameter field 42, a Time field 43, and a Count field 44.

An identification value of an application executed by the user may be recorded in the App field 40. For example, Message, SamsungPay, ShareVia, Internet, Smartthings, etc., may be recorded in the App field 40.

An action of an application executed by the user may be recorded in the Action field 41. For example, a value for identifying an action such as Send, Search, Up, and Off may be recorded in the Action field 41.

Detailed information about the action of the application executed by the user may be recorded in the Parameter field 42. For example, {what: Text, to: Mom} in relation to Send of a Message application, and {what: Money, to: Dad} in relation to Send of a SamsungPay application may be recorded in the Parameter field 42.

In addition, an execution time of the action of the application may be recorded in the Time field 43, and a cumulative execution count of the action of the application may be recorded in the Count field 44.

Figure 5:
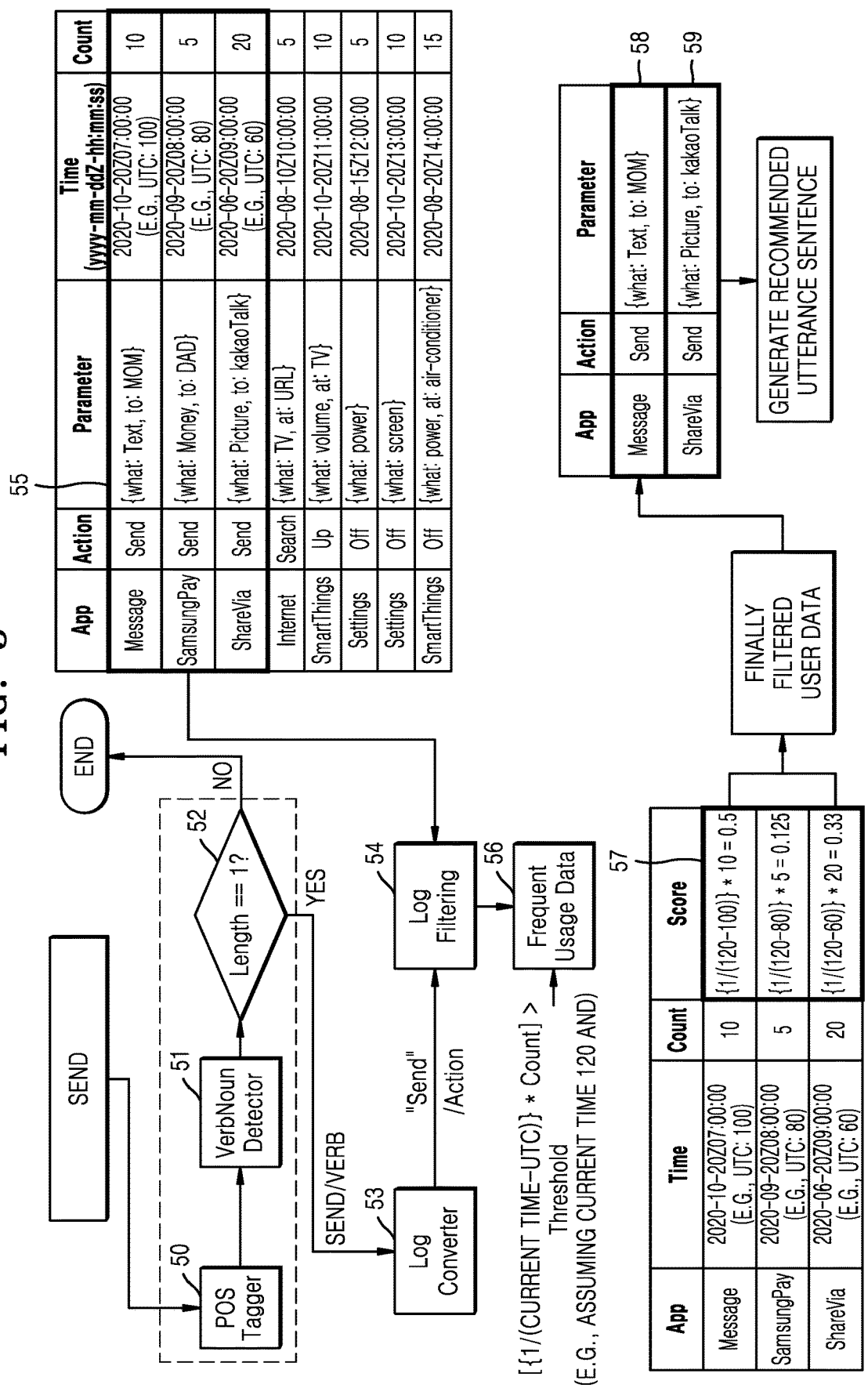
FIG. 5 is a diagram illustrating an example of extracting application history data with respect to a single utterance input that is a verb, according to an embodiment.

FIG. 5 is a diagram illustrating an example of extracting application history data with respect to a single utterance input that is a verb according to an embodiment.

Referring to FIG. 5, when a single utterance input "send" is input to the device 1000, the device 1000 may determine whether an input "send" is the single utterance input by executing the single utterance input determination module 1611. The single utterance input determination module 1611 may determine whether the input "send" is the single utterance input that is the verb or a noun using a POS Tagger 50 and a VerbNoun Detector 51, and may determine whether a length of the input "send" is less than or equal to a preset numerical value.

The device 1000 may extract the application history data related to the single utterance input "send" from the DB 1630 by executing the application history data extraction module 1612. The application history data extraction module 1612 may generate a search query Send/Action for retrieving the application history data related to "send" by using a Log Converter 53. The application history data extraction module 1612 may retrieve application history data 55 having a value of an Action field that is Send from an application history data table by performing log filtering 54 using the generated search query.

Also, the application history data extraction module 1612 may evaluate the retrieved application history data 55 in order to extract data related to a recently and/or frequently executed operation from among the retrieved application history data 55 (56). The application history data extraction module 1612 may use various criteria to evaluate the retrieved application history data 55, and select history data 58 about Message and history data 59 about ShareVia based on an evaluation score 57 (59). The history data 58 about Message and the history data 59 about ShareVia may be used to generate a recommended utterance sentence with respect to an utterance input "send".

Figure 6:
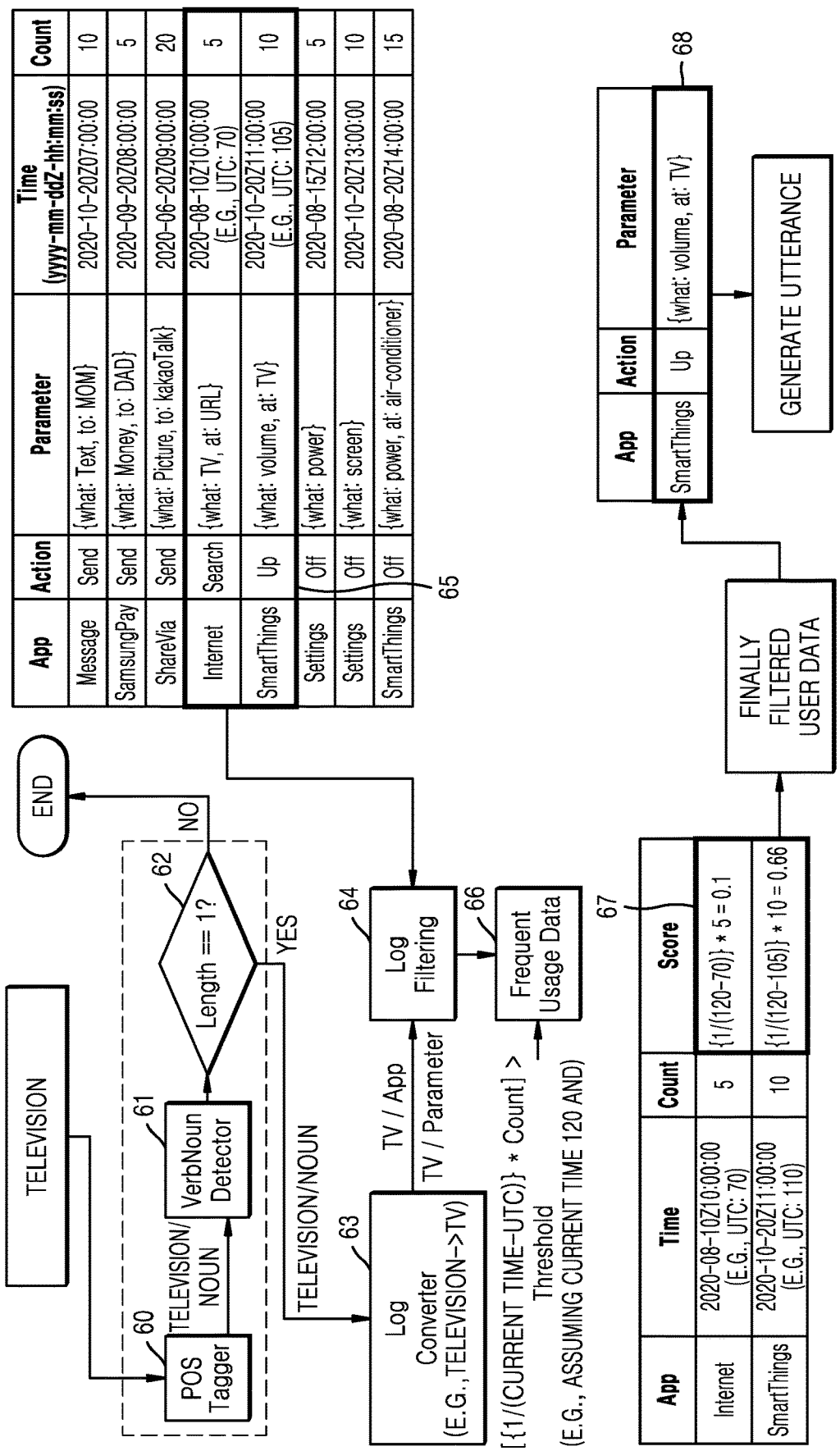
FIG. 6 is a diagram illustrating an example of extracting application history data with respect to a single utterance input that is a noun, according to an embodiment.

FIG. 6 is a diagram illustrating an example of extracting application history data with respect to a single utterance input that is a noun according to an embodiment.

Referring to FIG. 6, when the single utterance input "television" is input to the device 1000, the device 1000 determines whether the input "television" is the single utterance input by executing the single utterance input determination module 1611. The single utterance input determination module 1611 may use a POS Tagger 60 and a VerbNoun Detector 61 to determine whether the input "television" is the single utterance input that is a verb or a noun, and determine whether a length of the input "television" is less than or equal to a preset numerical value (62).

The device 1000 may extract application history data related to the single utterance input "television" from the DB 1630 by executing the application history data extraction module 1612. The application history data extraction module 1612 may generate search queries (TV/App and TV/Parameter) for retrieving the application history data related to "television" using a Log Converter 63. The application history data extraction module 1612 may retrieve application history data 65 in which TV is included in a value of an App field that is TV or TV is included in a value of a Parameter field from an application history data table by performing log filtering 64 using the generated search queries.

Also, the application history data extraction module 1612 may evaluate the retrieved application history data 65 in order to extract data related to a recently frequently executed operation from among the retrieved application history data 65 (66). The application history data extraction module 1612 may use various criteria to evaluate the retrieved application history data 65, and may select history data 68 about SmartThings based on an evaluation score 67. The history data 68 about SmartThings may be used to generate a recommended utterance sentence with respect to the utterance input "television".

Figure 7:
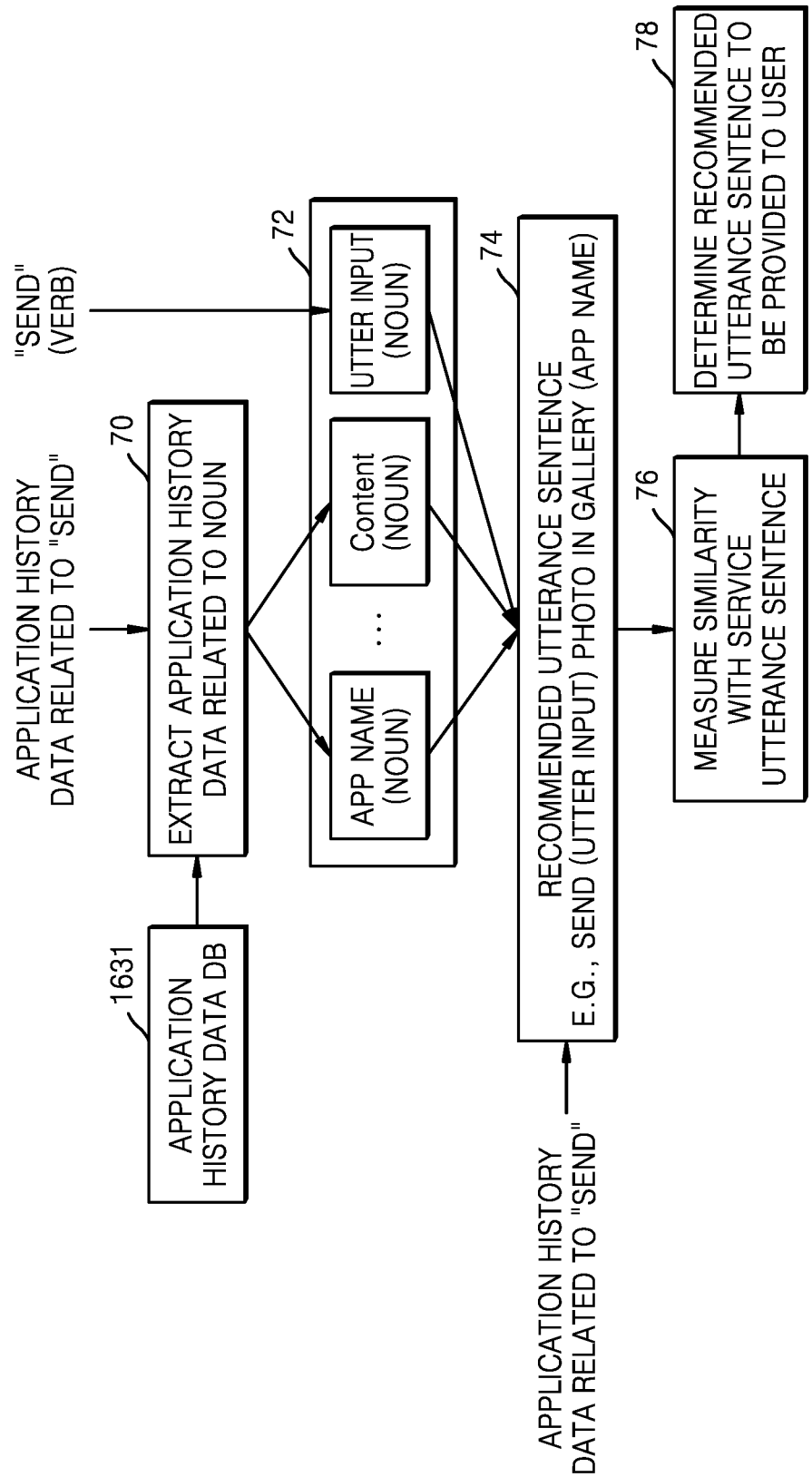
FIG. 7 is a diagram illustrating an example of generating a recommended utterance sentence with respect to a single utterance input that is a verb, according to an embodiment.

FIG. 7 is a diagram illustrating an example of generating a recommended utterance sentence with respect to a single utterance input that is a verb according to an embodiment.

Referring to FIG. 7, the device 1000 may generate the recommended utterance sentence related to "send" that is the single utterance input by executing the recommended utterance sentence generation module 1614. The recommended utterance sentence generation module 1614 may extract application history data related to a POS different from that of the single utterance input from the application history data DB 1631. For example, the recommended utterance sentence generation module 1614 may extract application history data related to a noun that is a POS different from the verb that is a POS of "send" from the application history data DB 1631. In this case, the recommended utterance sentence generation module 1614 may use application history data selected by the application history data generation module 1612 in relation to "send" to extract the application history data including the noun related to "send" from the application history data DB 1631.

Also, the recommended utterance sentence generation module 1614 may determine words to be included in the recommended utterance sentence by using the application history data related to the noun and "send" that is the single utterance input. In this case, a word of a POS different from that of the single utterance input may be determined as the word to be included in the recommended utterance sentence, and the type and number of the words to be included in the recommended utterance sentence may be determined according to various criteria. For example, the recommended utterance sentence generation module 1614 may determine an utterance input (verb), an App name (noun), and a Content (noun) as types of the words to be included in the recommended utterance sentence.

Also, the recommended utterance sentence generation module 1614 may determine words respectively corresponding to the determined types of words and generate the recommended utterance sentence including the determined words. For example, the recommended utterance sentence generation module 1614 may use the application history data related to "send" in order to determine the words corresponding to the determined types of words, and determine "Send a picture (Content) from a gallery (App name) (utterance input)" as the recommended utterance sentence.

In this case, the recommended utterance sentence generation module 1614 may generate the recommended utterance sentence by using a preset template for generating an utterance sentence. The template for generating the utterance sentence may be set differently according to items included in the application history data. For example, a template corresponding to a combination of an APP name, an Action, and a parameter in the application history data may be stored in advance.

Thereafter, the recommended utterance sentence evaluation module 1615 may calculate a similarity between a service utterance sentence and the recommended utterance sentence by comparing the service utterance sentence with the recommended utterance sentence. The recommended utterance sentence evaluation module 1615 may calculate the similarity between the service utterance sentence and the recommended utterance sentence using, for example, a TF-IDF-based cosine similarity technique. Also, the recommended utterance sentence evaluation module 1615 may determine whether to provide the recommended utterance sentence to a user based on the calculated similarity.

Figure 8:
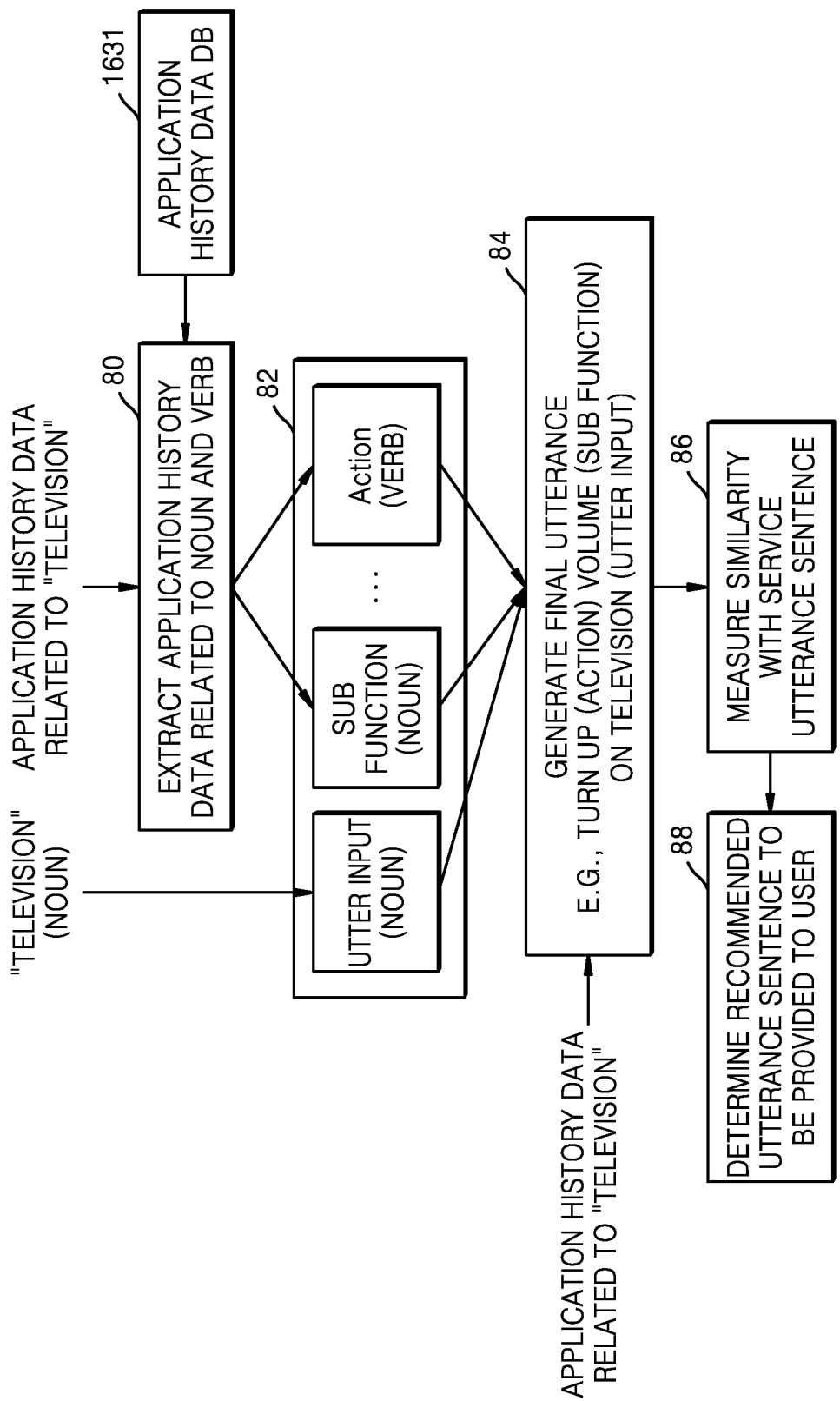
FIG. 8 is a diagram illustrating an example of generating a recommended utterance sentence with respect to a single utterance input that is a noun, according to an embodiment.

FIG. 8 is a diagram illustrating an example of generating a recommended utterance sentence with respect to a single utterance input that is a noun according to an embodiment.

Referring to FIG. 8, the device 1000 may generate the recommended utterance sentence related to the single utterance input "television" by executing the recommended utterance sentence generation module 1614. The recommended utterance sentence generation module 1614 may extract application history data related to the same POS as that of the single utterance input and a POS different from that of the single utterance input from the application history data DB 1631. For example, the recommended utterance sentence generation module 1614 may extract application history data related to a noun that is the same POS as a noun that is a POS of "television" and a verb that is a POS different from the noun that is the POS of "television" from the application history data DB 1631. In this case, the recommended utterance sentence generation module 1614 may use application history data selected by the application history data generation module 1612 in relation to "television" to extract the application history data including the noun and the verb related to "television" from the application history data DB 1631.

Also, the recommended utterance sentence generation module 1614 may determine words to be included in the recommended utterance sentence by using the application history data related to the noun and the verb and "television" that is the single utterance input. In this case, a word of a POS different from that of the single utterance input may be determined as the word to be included in the recommended utterance sentence, and the type and/or number of words to be included in the recommended utterance sentence may be determined according to various criteria. For example, the recommended utterance sentence generation module 1614 may determine an utterance input (noun), a Sub function (noun), and an Action (verb) as types of the words to be included in the recommended utterance sentence.

Also, the recommended utterance sentence generation module 1614 may determine words respectively corresponding to the determined types of words and generate a recommended utterance sentence including the determined words. For example, the recommended utterance sentence generation module 1614 may use the application history data related to "television" to determine the words corresponding to the determined types of words, and generate "Turn up (Action) the volume (Sub function) on the television (input utterance)" as the recommended utterance sentence. In this case, the recommended utterance sentence generation module 1614 may generate the recommended utterance sentence by using a preset template for generating an utterance sentence. The template for generating the utterance sentence may be set differently according to items included in the application history data. For example, a template corresponding to a combination of an APP name, an Action, and a parameter in the application history data may be stored in advance.

Thereafter, the recommended utterance sentence evaluation module 1615 may calculate a similarity between the service utterance sentence and the recommended utterance sentence by comparing the service utterance sentence with the recommended utterance sentence. The recommended utterance sentence evaluation module 1615 may calculate the similarity between the service utterance sentence and the recommended utterance sentence using, for example, the TF-IDF-based cosine similarity technique. Also, the recommended utterance sentence evaluation module 1615 may determine whether to provide the recommended utterance sentence to the user based on the calculated similarity.

Figure 9:
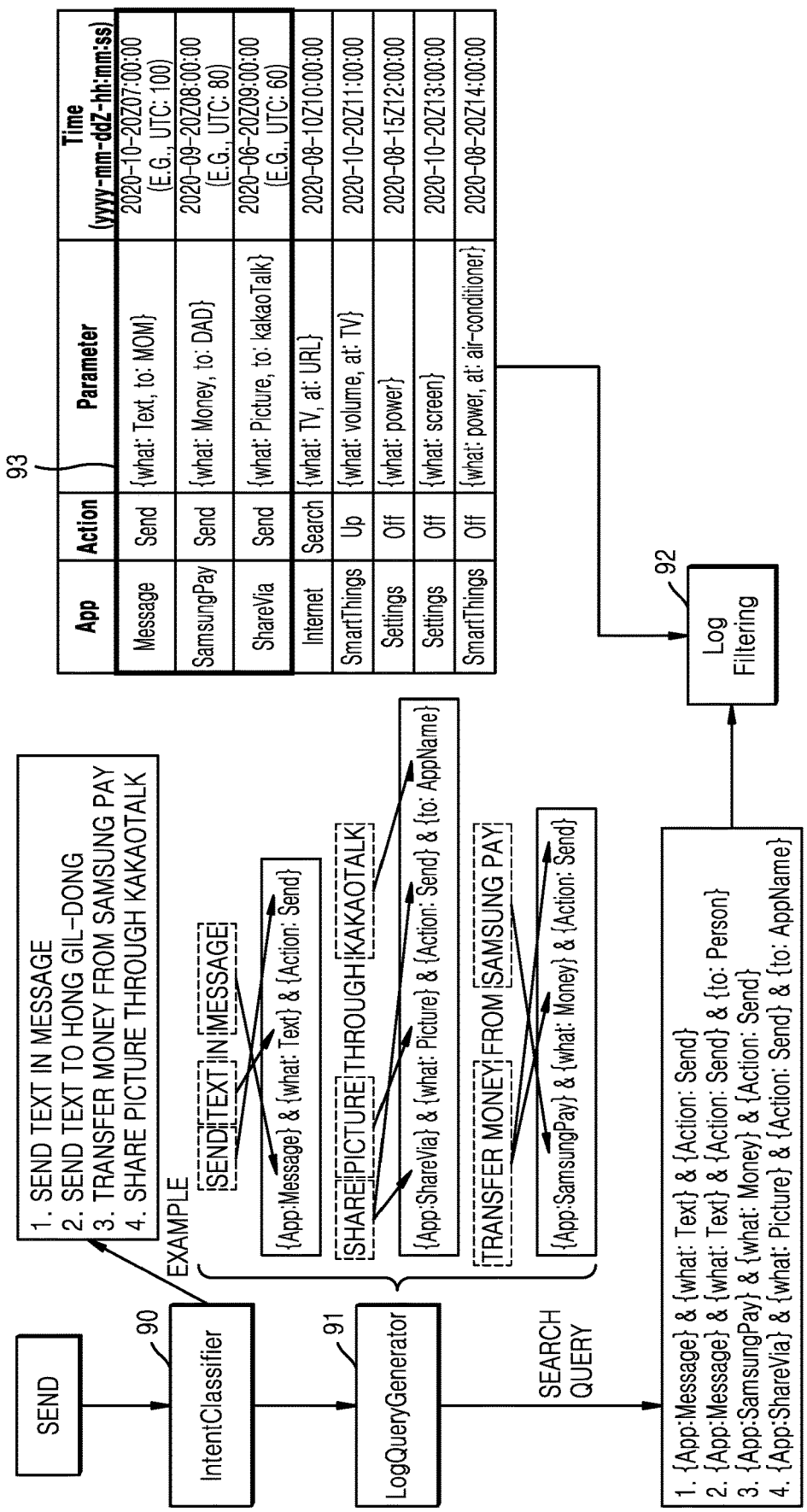
FIG. 9 is a diagram illustrating an example of retrieving application history data related to an utterance input using a service utterance sentence, according to an embodiment.

FIG. 9 is a diagram illustrating an example of retrieving application history data related to an utterance input using a service utterance sentence according to an embodiment.

Referring to FIG. 9, the application history data extraction module 1612 may extract the application history data related to the utterance input of a user from the application history data DB 1631 using a service utterance sentence provided through a voice assistant service.

For example, when the utterance input of the user is "send", the application history data extraction module 1612 may extract the service utterance sentence having an Intent related to "send" from among service utterance sentences of the voice assistant service using an IntentClassifier 90. The IntentClassifier 90 may extract the service utterance sentence including a word similar to "send" from the utterance history data DB 1632 using a Classification algorithm of a machine learning technique or TF-IDF. The application history data extraction module 1612 may extract, for example, "Send a text in a message", "Share a picture through KakaoTalk", and "Transfer money from Samsung Pay" from the utterance history data DB 1632.

Also, the application history data extraction module 1612 may generate a search query for retrieving application history data related to the utterance input from the extracted service utterance sentence using a LogQueryGenerator 91. The application history data extraction module 1612 may generate, for example, "{App:Message} & {what: Text} & {Action: Send}" from "Send a text in a message" as the search query. In addition, the application history data extraction module 1612 may generate, for example, "{App:Message} & {what: Text} & {Action: Send} & {to: Person}" from "Send a text to Hong Gil-dong" as the search query. In addition, the application history data extraction module 1612 may generate, for example, "{App:ShareVia} & {what: Picture} & {Action: Send} & {to: AppName}" from "Share a picture through KakaoTalk" as the search query. Also, the application history data extraction module 1612 may generate, for example, "{App:SamsungPay} & {what: Money} & {Action: Send}" from "Transfer money from Samsung Pay" as the search query. In this case, the generated search query may have a format of application history data.

Also, the application history data extraction module 1612 may extract application history data 93 related to "send" from the application history data by performing logfiltering 92 using the generated search query.

Figure 10:
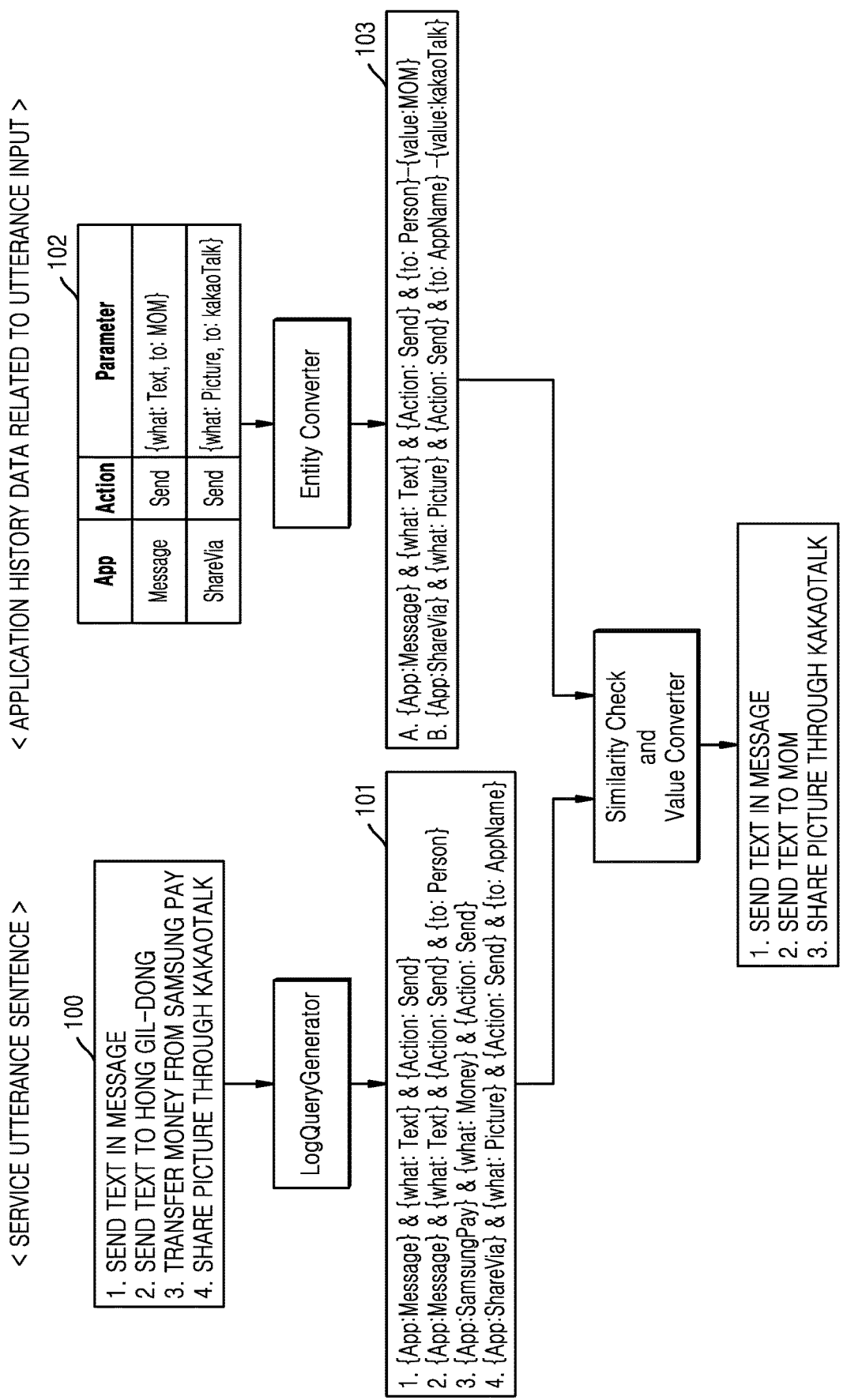
FIG. 10 is a diagram illustrating an example of generating a recommended utterance sentence when application history data is retrieved using a service utterance sentence of a voice assistant service, according to an embodiment.

FIG. 10 is a diagram illustrating an example of generating a recommended utterance sentence when application history data 102 is retrieved using a service utterance sentence 100 of a voice assistant service according to an embodiment of the disclosure.

Referring to FIG. 10, the recommended utterance sentence generation module 1614 may generate the recommended utterance sentence using the service utterance sentence 100 and the application history data 102. The recommended utterance sentence generation module 1614 may generate sentence data 103 reflecting a value of an entity in application history data 102 using an EntityConverter, and generate a search query 101 from the service utterance sentence 100 using a LogQueryGenerator. In addition, the recommended utterance sentence generation module 1614 may generate the recommended utterance sentence by changing a value of an entity included in the search query 101 generated from the service utterance sentence 100 to the value of the entity in the application history data 102 based on a similarity between the generated sentence data 103 and the search query 101.

For example, when a query sentence generated from the service utterance sentence 100 is "{App:Message} & {what: Text} & {Action: Send} & {to: Person}", and the sentence data 103 generated from history data retrieved from the application history data 102 is "{App:Message} & {what: Text} & {Action: Send} & {to: Person}-{value: Mom}", the recommended utterance sentence generation module 1614 may determine a value corresponding to "{to: Person}" which is an entity in the service utterance sentence 100 as "{value: Mom}". In addition, the recommended utterance sentence generation module 1614 may generate a recommended utterance sentence "Send a text to Mom" using "{App:Message} & {what: Text} & {Action: Send} & {to: Person}-{value: Mom}" generated by modifying the query sentence in the service utterance sentence 100.

Figure 11:
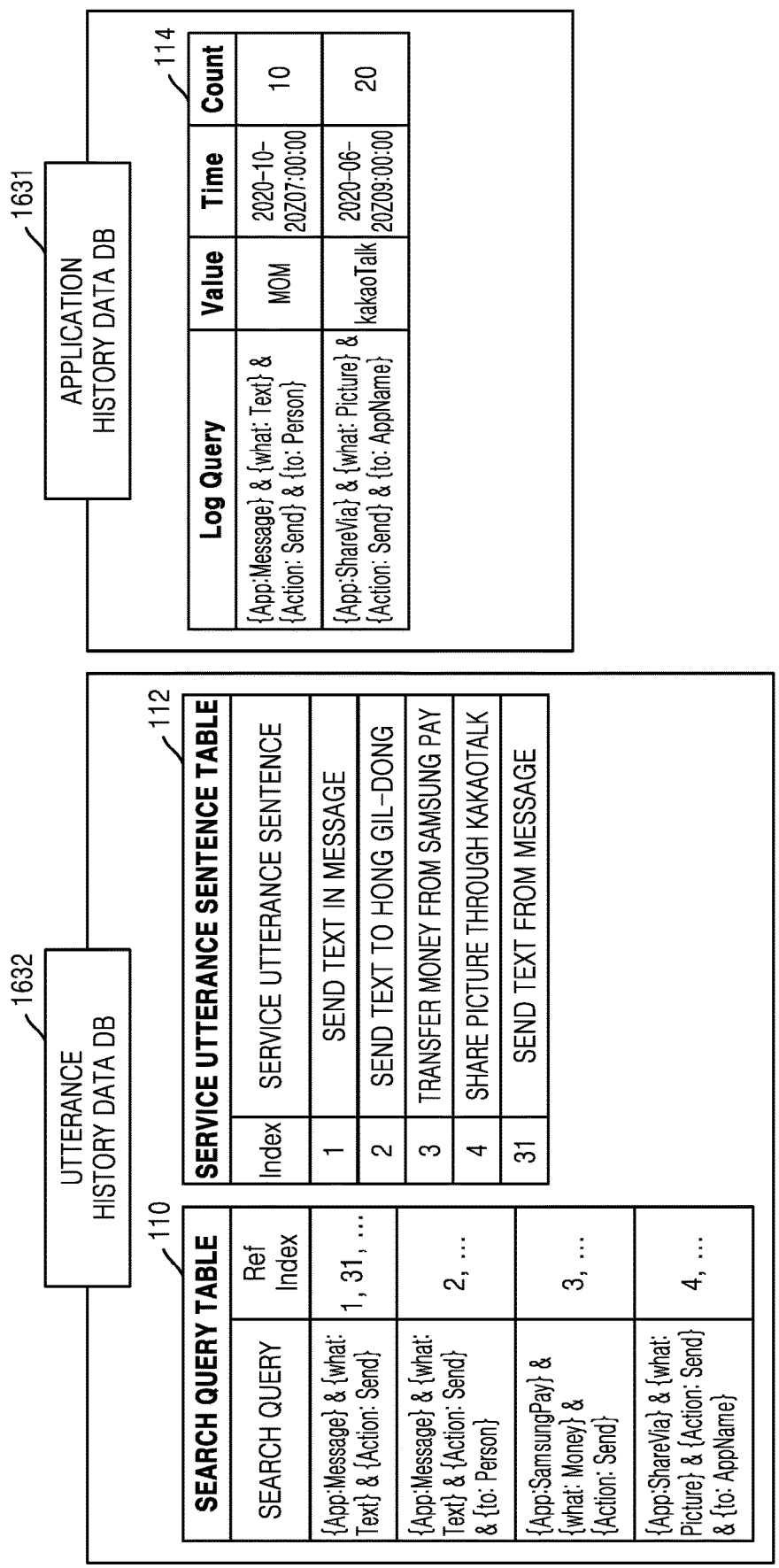
FIG. 11 is a diagram illustrating an example of generating application history data supported by a voice assistant service, according to an embodiment.

FIG. 11 is a diagram illustrating an example of generating application history data 114 supported by a voice assistant service according to an embodiment.

Referring to FIG. 11, the application history data 114 supported by the voice assistant service may be generated in advance, and the device 1000 may provide a recommended utterance sentence generated using the application history data 114 supported by the voice assistant service to a user without comparing the recommended utterance sentence with a service utterance sentence.

A search query table 110 representing a search query generated from a service utterance sentence of the voice assistant service and a service utterance sentence table 112 representing a service utterance sentence provided through the voice assistant service may be stored in the utterance history data DB 1632. The search query generated from the service utterance sentence and an index value of the service utterance sentence corresponding to the search query may be recorded in the search query table 110, and service utterance sentences may be accumulated and stored in the service utterance sentence table 112. The search query table 110 and the service utterance sentence table 112 may be previously generated and stored in order to provide the voice assistant service with respect to a single utterance input.

Also, as the user uses the device 1000, the application history data generation module 1612 may generate the application history data 114 and determine whether the generated application history data 114 is supported by the voice assistant service. The application history data generation module 1612 may determine whether the generated application history data 114 is supported by the voice assistant service by comparing the generated application history data 114 with search queries in the search query table 110. Also, the application history data generation module 1612 may store the application history data 114 supported by the voice assistant service in the application history data DB 1631. When the application history data 114 supported by the voice assistant service is stored, the application history data generation module 1612 may convert a query sentence corresponding to the application history data 114 into the form of a query sentence generated from the service utterance sentence and store the query sentence (for example, in the search query table 110 or in a separate table and/or DB).

Thereafter, when the single utterance input of the user is received, the device 1000 may extract application history data related to the single utterance input from among the application history data 114 supported by the voice assistant, and obtain the recommended utterance sentence based on the extracted application history data.

Figure 12:
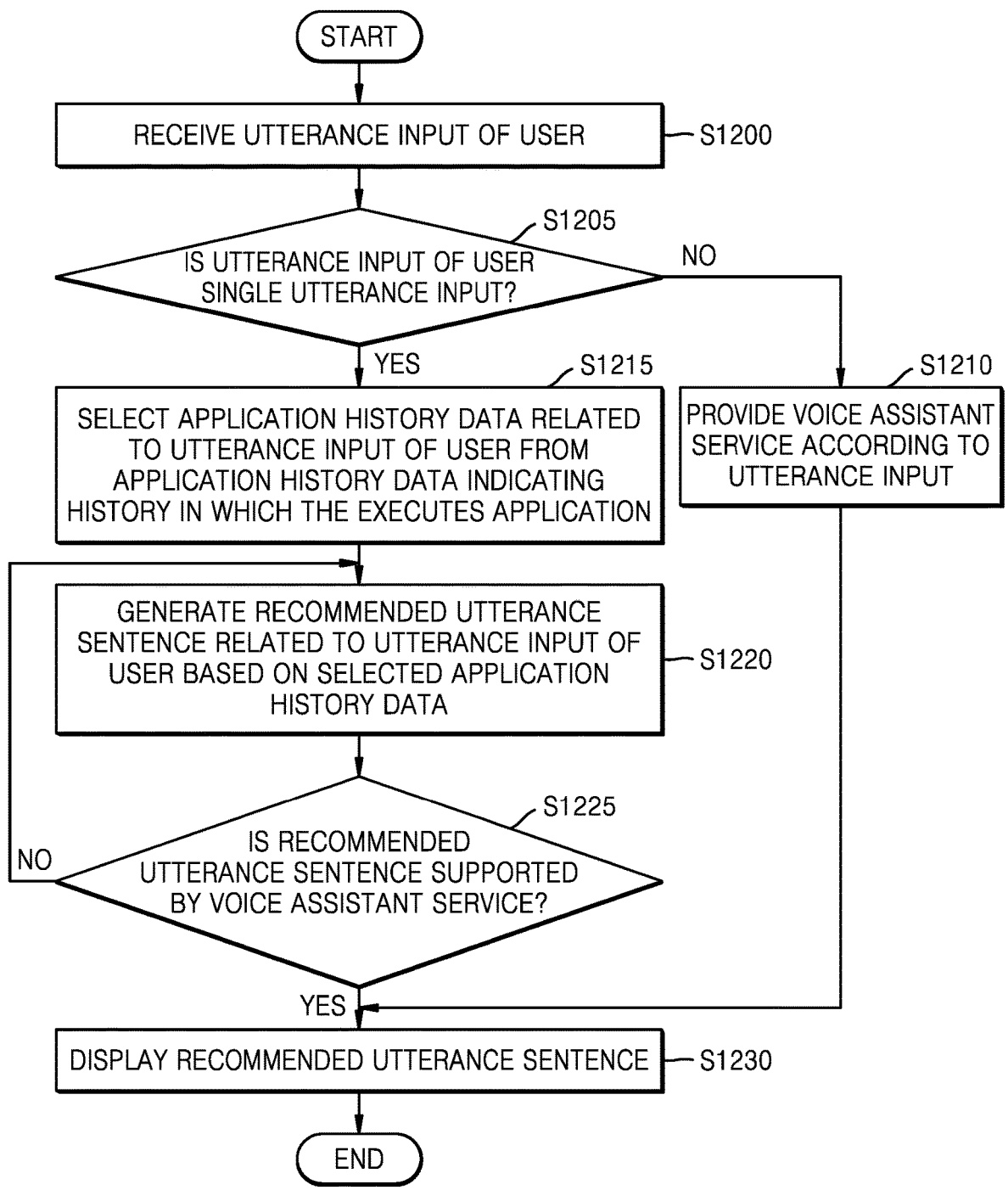
FIG. 12 is a flowchart of a method, performed by a device, of providing a recommended sentence related to a single utterance input, according to an embodiment.

FIG. 12 is a flowchart of a method, performed by the device 1000, of providing a recommended sentence related to a single utterance input according to an embodiment.

In operation S1200, the device 1000 may receive an utterance input of a user. The device 1000 may receive the utterance input of the user for a voice assistant service through a microphone 1300.

In operation S1205, the device 1000 may determine whether the utterance input of the user is the single utterance input. The device 1000 may determine the utterance input of the user as the single utterance input when a POS corresponding to a term indicated by the utterance input of the user is a preset POS, and/or a length of the term indicated by the utterance input of the user is less than or equal to a preset threshold. For example, the device 1000 may determine whether the POS corresponding to the term corresponding to the utterance input of the user is a noun, a verb, a noun phrase, or a verb phrase by using a POS tagger. Also, for example, a length of a term corresponding to the single utterance input may be previously set, and the device 1000 may determine whether the length of the term corresponding to the utterance input of the user is less than the preset length.

As a result of the determination in operation S1205, when it is determined (or based on determining) that the utterance input of the user is not the single utterance input, the device 1000 may provide a voice assistant service according to the utterance input in operation S1210. In this case, the device 1000 may interpret the utterance input of the user using the NLU model 1621 and provide the voice assistant service related to interpretation results to the user.

As a result of determination in operation S1205, when it is determined (or based on determining) that the utterance input of the user is the single utterance input, in operation S1215, the device 1000 may select application history data related to the utterance input of the user from application history data indicating a history in which the user executes one or more applications.

The device 1000 may extract the application history data related to the utterance input of the user from among application history data stored in the storage 1600. The device 1000 may retrieve and extract the application history data related to the utterance input of the user from among the application history data stored in the storage 1600 so as to generate a recommended utterance sentence with respect to the utterance input of the user.

Also, the device 1000 may generate a search query for retrieving the application history data related to the utterance input of the user. For example, when the utterance input of the user is the single utterance input of the verb or the verb phrase, the device 1000 may generate the search query for retrieving an action executed in an application in the device 1000. In this case, when a word corresponding to the utterance input of the user is "send", by way of example, the device 1000 may generate "Action/send" for retrieving an action in the application history data as the search query. Also, for example, when the utterance input of the user is the single utterance input that is the noun or the noun phrase, the device 1000 may generate the search query for retrieving a parameter related to a name of the application and the action executed in the application. In this case, when the word corresponding to the utterance input of the user is "TV", by way of example, the processor 1700 may generate "App/TV" for retrieving the name of the application in the application history data, and "Para/TV" for retrieving the parameter related to the action of the application in the application history data as the search query.

While it has been described above that application history data related to the utterance input is retrieved by using an utterance input word as the search query, it is understood that one or more other embodiments are not limited thereto. For example, the processor 1700 may extract words similar to the utterance input word from the similar word DB 1633, and generate the search query using the utterance input word and the extracted similar words.

Also, for example, the search query may be generated using the service utterance sentence provided by the voice assistant service. In this case, the device 1000 may obtain a service utterance sentence related to the utterance input word. The device 1000 may obtain, for example, a service utterance sentence related to the utterance input by using a machine learning-based classification algorithm, or may obtain a service utterance sentence including a word which is similar to the utterance input word in a TF-IDF. Also, the device 1000 may generate the query sentence for retrieving the application history data from the service utterance sentence related to the utterance input. In this case, the generated query statement may be generated to have a format of the application history data (e.g., a format compatible for searching or querying the application history data, a format having fields corresponding to the application history data, etc.).

Also, the device 1000 may retrieve the application history data related to the utterance input of the user using the generated search query. For example, when the search query is "Action/send", the device 1000 may retrieve history data in which a value corresponding to "Action" is "send" from among the application history data. When the search query is "App/TV" and "Para/TV", the device 1000 may retrieve history data in which a value corresponding to "App" is "TV" from among the application history data and history data including "TV" from among "Para" values. Also, the device 1000 may filter and select history data that has been executed a number of times greater than or equal to a certain threshold from among the retrieved history data.

In operation S1220, the device 1000 may generate the recommended utterance sentence related to the utterance input of the user based on the selected application history data. The device 1000 may determine a word for generating the recommended utterance sentence in addition to the utterance input word. The word for generating the recommended utterance sentence in addition to the utterance input word may be, for example, a word of a POS different from that of the utterance input word. The device 1000 may analyze the application history data related to the utterance input word and select the word for generating the recommended utterance sentence. For example, when the utterance input word is "send", the processor 1700 may select "gallery application" and "picture" which are words of a POS different from that of "send" from application history data related to "send" as words for generating the recommended utterance sentence. Also, for example, when the utterance input word is "send", the device 1000 may select "Samsung Pay" and "money" which are words of the POS different from that of "send" from the application history data related to "send" as the words for generating the recommended utterance sentence.

The device 1000 may generate the recommended utterance sentence by combining the utterance input word and the words determined from the application history data. For example, the device 1000 may combine the utterance input word "send" with the words "gallery application" and "picture" determined from the application history data to generate a recommended utterance sentence "Send a picture from the gallery application". Further, the device 1000 may combine the utterance input word "send" with the words "Samsung Pay" and "money" determined from the application history data to generate a recommended utterance sentence "Send money with Samsung Pay".

In this case, some words of the recommended utterance sentence may be modified to similar words. For example, "Send a picture from the gallery application" may be modified to "Send a picture through the gallery application", and "Send money with Samsung Pay" may be modified to "Transfer money with Samsung Pay."

Meanwhile, when the application history data is retrieved using the service utterance sentence of the voice assistant service, the device 1000 may generate the recommended utterance sentence by using the service utterance sentence and the application history data. The device 1000 may generate the recommended utterance sentence by changing a value of an entity included in the query sentence generated from the service utterance sentence to a value of an entity in the application history data. For example, when the query sentence generated from the service utterance sentence is "{App: Message} & {what: Text} & {Action: Send} & {to: Person}", and the query sentence generated from the history data retrieved from the application history data is "{App: Message} & {what: Text} & {Action: Send} & {to: Person}-{value:Mom}", the processor 1700 may determine a value corresponding to the entity "{to: Person}" in the service utterance sentence as "{value:Mom}". In addition, the processor 1700 may generate a recommended utterance sentence "Send a text to Mom" by using "{App:Message} & {what: Text} & {Action: Send} & {to: Person}-{value: Mom}" generated by modifying the query sentence in the service utterance sentence.

Meanwhile, the device 1000 may modify the recommended utterance sentence by using a new function supported by the voice assistant service. The device 1000 may modify the generated recommended utterance sentence in consideration of at least one of a function of an application that is not frequently used by the user or a new function of the application. In this case, the device 1000 may identify a function related to the utterance input of the user from the application history data related to the utterance input of the user, and when there is a new function of the application related to the identified function, may generate the recommended utterance based on the new function. For example, when the generated recommended utterance sentence is "Send a text with the messenger application", the device 1000 may modify the recommended utterance sentence to generate "Send a text with the KakaoTalk application." Also, the device 1000 may, for example, modify the recommended utterance sentence "transfer money with Samsung Pay" to "transfer money with Kakao Pay".

In operation S1225, the device 1000 may determine whether the recommended utterance sentence is supported by the voice assistant service. The device 1000 may identify whether the function corresponding to the recommended utterance sentence is executable by the device 1000 related to the voice assistant service and/or another device. To this end, the device 1000 may determine whether the recommended utterance sentence is supported by the voice assistant service by comparing service utterance sentences provided by the voice assistant service with the recommended utterance sentence. The device 1000 may select a service utterance sentence related to the recommended utterance sentence from among the service utterance sentences provided by the voice assistant service. In addition, the device 1000 may calculate similarity between the selected service utterance sentence and the recommended utterance sentence, and when the calculated similarity is greater than a preset threshold value, may determine that the recommended utterance sentence is supported by the voice assistant service. For example, the processor 1700 may calculate the similarity between the recommended utterance sentence and the service utterance sentence by using a TF-IDF based cosine similarity technique.

As a result of determination in operation S1225, when it is determined (or based on determining) that the recommended utterance sentence is not supported by the voice assistant service, the device 1000 may generate or select another recommended utterance sentence.

When it is determined (or based on determining) in operation S1225 that the recommended utterance sentence is supported by the voice assistant service, the device 1000 may display the recommended utterance sentence on a screen of the device 1000 in operation S1230. When (or based on) a plurality of recommended utterance sentences supported by the voice assistant service are generated, the device 1000 may select a recommended utterance sentence to be provided to the user from among the plurality of recommended utterance sentences based on the similarity.

The device 1000 may display a certain GUI (and/or output an audio query or signal) including the recommended utterance sentence supported by the voice assistant service on the display 1200 and receive a feedback input of the user.

The device 1000 may modify the recommended utterance sentence according to the feedback input of the user. In this case, the device 1000 may display a GUI for modifying the recommended utterance sentence on the display 1200 and modify the recommended utterance sentence according to a user input through the displayed GUI. Alternatively, the device 1000 may receive an utterance of the user for modifying the recommended utterance sentence, and modify the recommended utterance sentence based on the utterance of the user.

Also, the device 1000 may execute a function of the voice assistant service corresponding to the recommended utterance sentence. When the recommended utterance sentence is modified by the user, the device 1000 may perform a function of the voice assistant service corresponding to the modified recommended utterance sentence.

A function related to artificial intelligence (AI) in one or more embodiments may be performed by a processor and a memory. The processor may include one processor or a plurality of processors. In this case, the one processor or the plurality of processors may include a general-purpose processor such as a central processing unit (CPU), an application processor (AP), a digital signal processor (DSP), etc., a graphic-dedicated processor such as a GPU, a vision processing unit (VPU), etc., or an AI-dedicated processor such as a neural processing unit (NPU). The one processor or the plurality of processors may control data to be processed according to a predefined operation rule or AI model stored in the memory. When the one processor or the plurality of processors include an AI-dedicated processor, the AI-dedicated processor may be designed to have a hardware structure specialized for processing a specific AI model.

The predefined operation rule or AI model may be made through training. Herein, when the AI model is made through training, it may mean that a basic AI model is trained based on a learning algorithm by using multiple training data, such that the predefined operation rule or AI model set to execute desired characteristics (or purpose) is made. Such training may be performed by a device on which AI according to the disclosure is implemented, or by a separate server and/or system. Examples of a learning algorithm may include, but are not limited to, supervised learning, unsupervised learning, semi-supervised learning, or reinforcement learning.

The AI model may include a plurality of neural network layers. Each of the plurality of neural network layers may have a plurality of weight values, and perform a neural network operation through an operation between an operation result of a previous layer and the plurality of weight values. The plurality of weight values of the plurality of neural network layers may be optimized by a training result of the AI model. For example, the plurality of weight values may be updated to reduce or minimize a loss value or a cost value obtained in the AI model during a training process. Examples of the AI neural network may include, but are not limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), and a deep Q-network.

In a voice assistant service according to an embodiment, a device may receive a speech signal, which is an analog signal, through a microphone, and convert the speech signal into computer-readable text by using an automatic speech recognition (ASR) model, as a method of recognizing a user's voice and interpreting a user's intention. A user's utterance intention may be obtained by interpreting the converted text using a Natural Language Understanding (NLU) model. The ASR model or the NLU model may be an AI model. The AI model may be processed by an AI-only processor designed with a hardware structure specialized for processing the AI model. The AI model may be made through training. Herein, when the AI model is made through training, it may mean that a basic AI model is trained based on a learning algorithm by using multiple training data, such that the predefined operation rule or AI model set to execute desired characteristics (or purpose) is made. The AI model may include a plurality of neural network layers. Each of the plurality of neural network layers may have a plurality of weight values, and perform a neural network operation through an operation between an operation result of a previous layer and the plurality of weight values.

Linguistic understanding is a technology that recognizes and applies/processes human language/character, and thus includes natural language processing, machine translation, a dialog system, question answering, and speech recognition/speech recognition/synthesis, etc.

One or more embodiments may also be implemented in the form of a recording medium including instructions executable by a computer, such as a program module executed by a computer. Computer-readable media may be any available media accessible by a computer and includes both volatile and nonvolatile media and removable and non-removable media. Computer-readable media may also include computer storage media and communication media. Computer storage media includes both volatile and nonvolatile, removable and non-removable media implemented in any method or technology for storage of information such as computer readable instructions, data structures, program modules or other data. Communication media may typically include computer readable instructions, data structures, or other data in a modulated data signal, such as program modules.

The computer-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium. For example, the 'non-transitory storage medium' may include a buffer in which data is temporarily stored.

A method according to one or more embodiments may be included and provided in a computer program product. The computer program product may be traded as a product between a seller and a buyer. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

A term "unit" used herein may be a hardware component such as a processor or circuit, and/or a software component executed by a hardware component such as a processor.

While the disclosure has been particularly shown and described with reference to exemplary embodiments, it will be understood that various changes in form and details may be made therein without departing from the spirit and scope of the disclosure. Thus, the above-described embodiments should be considered in descriptive sense only and not for purposes of limitation. For example, each component described as a single type may be implemented in a distributed manner, and similarly, components described as being distributed may be implemented in a combined form.

The scope of the disclosure is indicated by at least the scope of the claims described below, and all changes or modified forms derived from the meaning and scope of the claims and the concept of equivalents thereof should be interpreted as being included in the scope of the disclosure.

The invention claimed is:

1. A method, performed by a device for providing a voice assistant service, of providing a recommended utterance sentence related to an utterance input of a user, the method comprising:
receiving the utterance input of the user;
determining whether the utterance input is a short utterance input based on at least one of a part-of-speech (POS) of a word included in the utterance input or a length of the utterance input, wherein the POS is one of: a verb, noun, verb phrase, or noun phrase;
in response to the utterance input being determined as the short utterance input, generating a search query based on the POS of the utterance input to obtain application history data related to the utterance input from among application history data representing an execution history of one or more applications executed by the user in the device;
generating the recommended utterance sentence related to the utterance input by combining the word included in the utterance input with at least one recommended word from the obtained application history data;
determining whether the recommended utterance sentence is supported by the voice assistant service provided by the device; and based on the recommended utterance sentence being determined to be supported by the voice assistant service, outputting the recommended utterance sentence.

2. The method of claim 1, wherein:
the generating the search query to obtain the application history data related to the utterance input comprises:
comparing the word included in the utterance input with a parameter in the application history data representing the execution history of the one or more applications, and
extracting the application history data related to the utterance input from among the application history data representing the execution history of the one or more applications based on the comparing; and
wherein the generating the recommended utterance sentence comprises generating the recommended utterance sentence by using the extracted application history data.

3. The method of claim 2, wherein the extracting the application history data related to the utterance input comprises:
extracting the application history data related to the utterance input from among the application history data representing the execution history of the one or more applications, based on an execution frequency of an operation corresponding to the application history data related to the utterance input.

4. The method of claim 1, wherein the generating the recommended utterance sentence comprises:
identifying the POS of the word included in the utterance input; and
generating the at least one recommended word corresponding to a POS different from the identified POS based on the application history data.

5. The method of claim 1, wherein the determining whether the recommended utterance sentence is supported by the voice assistant service comprises:
obtaining a service utterance sentence related to the recommended utterance sentence from among service utterance sentences provided by the voice assistant service;
obtaining a similarity between the obtained service utterance sentence and the recommended utterance sentence; and
determining whether the recommended utterance sentence is supported by the voice assistant service based on the obtained similarity.

6. The method of claim 1, further comprising:
receiving a selection input of the user with respect to the output recommended utterance sentence; and
providing the voice assistant service based on the selected recommended utterance sentence based on the output recommended utterance sentence being selected by the user.

7. The method of claim 1, wherein the application history data representing the execution history of the one or more applications is previously generated by the device before the utterance input is received.

8. The method of claim 1, further comprising:
generating the application history data representing the execution history of the one or more applications executed by the user in the device;
selecting application history data related to an operation supported by the voice assistant service from among the generated application history data; and
storing the selected application history data in a memory of the device,
wherein the extracting the application history data related to the utterance input of the user comprises extracting the application history data related to the utterance input of the user from among the application history data stored in the memory.

9. A non-transitory computer-readable recording medium having recorded thereon a computer program for performing the method of claim 1.

10. A device for providing a voice assistant service, the device comprising:
a microphone configured to receive an utterance input of a user;
a memory storing one or more instructions; and
a processor configured to provide a recommended utterance sentence related to the utterance input of a user by executing the one or more instructions to:
determine whether the utterance input is a short utterance input based on at least one of a part-of-speech (POS) of a word included in the utterance input or a length of the utterance input, wherein the POS is one of: a verb, noun, verb phrase, or noun phrase;
in response to the utterance input being determined as the short utterance input, generate a search query based on the POS of the utterance input to obtain application history data related to the utterance input from among application history data representing an execution history of one or more applications executed by the user in the device;
generate the recommended utterance sentence related to the utterance input by combining a word included in the utterance input with at least one recommended word from the obtained application history data;
determine whether the recommended utterance sentence is supported by the voice assistant service provided by the device; and
based on the recommended utterance sentence being determined to be supported by the voice assistant service, control to output the recommended utterance sentence.

11. The device of claim 10, wherein the processor is configured to execute the one or more instructions to:
compare the word included in the utterance input with a parameter in the application history data representing the execution history of the one or more applications;
extract the application history data related to the utterance input from among the application history data representing the execution history of the one or more applications based on the comparing; and
generate the recommended utterance sentence by using the extracted application history data.

12. The device of claim 11, wherein the processor is configured to execute the one or more instructions to extract the application history data related to the utterance input from among the application history data representing the execution history of the one or more applications, based on an execution frequency of an operation corresponding to the application history data related to the utterance input.

13. A device for providing a voice assistant service, the device comprising:
a memory storing one or more instructions; and
a processor configured to provide a recommended utterance sentence related to an utterance input of a user by executing the one or more instructions to:

obtain the utterance input of the user;
determine whether the utterance input is a short utterance input based on at least one of a part-of-speech (POS) of a word included in the utterance input or a length of the utterance input, wherein the POS is one of: a verb, noun, verb phrase, or noun phrase;
based in response to the utterance input being determined as the short utterance input, generate a search query based on the POS of the utterance input to obtain application history data related to the utterance input from among application history data representing an execution history of one or more applications executed by the user in at least one of the device or another device;
generate the recommended utterance sentence related to the utterance input by combining a word included in the utterance input with at least one recommended word from the obtained application history data;
determine whether the recommended utterance sentence is supported by the voice assistant service provided by the device; and
control to output the recommended utterance sentence based on the recommended utterance sentence being determined to be supported by the voice assistant service.

14. The device of claim 13, wherein the processor is configured to execute the one or more instructions to:
compare a word included in the utterance input with a parameter in the application history data representing the execution history of the one or more applications;
extract the application history data related to the utterance input from among the application history data representing the execution history of the one or more applications based on the comparing; and
generate the recommended utterance sentence by using the extracted application history data.

15. The device of claim 14, wherein the processor is configured to execute the one or more instructions to extract the application history data related to the utterance input from among the application history data representing the execution history of the one or more applications, based on an execution frequency of an operation corresponding to the application history data related to the utterance input.

* * * * *